United States Patent [19]
Morita et al.

[11] Patent Number: 5,706,112
[45] Date of Patent: Jan. 6, 1998

[54] LIGHT SIGNAL REMOTE CONTROL APPARATUS AND LIGHT SIGNAL LEVEL CONTROLLING METHOD

[75] Inventors: Takayoshi Morita; Akihiko Ichikawa, both of Sapporo, Japan

[73] Assignee: Fujitsu Limited, Kawasaki, Japan

[21] Appl. No.: 724,447

[22] Filed: Oct. 1, 1996

[30] Foreign Application Priority Data

Oct. 23, 1995 [JP] Japan ................. 7-274560

[51] Int. Cl.$^6$ ................................. H04B 10/00
[52] U.S. Cl. ................. 359/142; 359/110; 359/147; 359/173; 359/177; 359/187; 340/825.06
[58] Field of Search ................. 359/110, 115, 359/142–143, 147, 173, 177, 187–188; 348/734; 340/825.06; 455/67.1

[56] References Cited

U.S. PATENT DOCUMENTS 5,291,326 3/1994 Heidemann ................. 359/110
5,500,756 3/1996 Tsushima et al. ................. 359/177
5,539,557 7/1996 Horiuchi et al. ................. 359/110

*Primary Examiner*—Kinfe-Michael Negash
*Attorney, Agent, or Firm*—Staas & Halsey

[57] ABSTRACT

A remote light signal control apparatus is disclosed wherein the level of the light output thereof is fixed with a high degree of accuracy and, even when an ALC loop is opened, a laser diode can emit light at a stable level to assure a high degree of reliability of the laser diode. A first control section is provided in one of a light reception section and a light transmission section. The light transmission section includes a second light detection section for detecting a light emitting condition of a light source, a second control section for outputting, in response to light detection information detected by the second light detection section, a light control signal for controlling the state of a light signal from the light source, and a switch section for selectively outputting to the light source one of the light control signal from the first control section and the light control signal from the second control section with which the level of the light signal from the light source is controlled lower than that with the other.

46 Claims, 19 Drawing Sheets

LIGHT SIGNAL REMOTE CONTROL APPARATUS AND LIGHT SIGNAL LEVEL CONTROLLING METHOD

BACKGROUND OF THE INVENTION

1. Field of the Invention

This invention relates to a light signal remote control apparatus and a light signal level controlling method for a light signal remote control apparatus as well as a light signal transmission apparatus and a supervisory signal light level controlling method for a light signal transmission apparatus which are suitable for use with a light signal transmission system for transmitting data at a high speed using a light signal.

2. Description of the Related Art

In recent years, in a light signal transmission system for transmitting a light signal via an optical fiber, signal light of, for example, approximately 10 gigabits is repeated and transmitted via an optical fiber.

Upon transmission of such a light signal of approximately 10 gigabits as described above, using a wavelength band of, for example, approximately 1.55 μm as a main signal, supervisory signal light using a wavelength band of, for example, approximately 1.52 μm (the amount of information is 1.5 megabits) is produced by means of, for example, a laser diode or the like and is combined with and transmitted together with a main signal of approximately 10 gigabits.

The supervisory signal light includes alarm information of an obstacle or the like, supervision information of a transmission system and so forth so that the transmission system is supervised to detect an obstacle or the like.

By the way, in order to produce supervisory signal light described above, driving current is supplied to a laser diode (LD) so that the laser diode may emit light serving as the supervisory signal light. The light output level of the laser diode has a characteristic that, where the driving current is fixed, it decreases as the temperature rises, but it increases as the temperature drops. However, in order to control the light power fixed to stabilize the transmission characteristic, it is desirable to produce supervisory signal light suppressing the variation of the light output level to a minimum level.

FIG. 19 is a block diagram showing a light signal transmission apparatus to which a light signal remote control apparatus for controlling supervisory signal light is applied. Referring to FIG. 19, the light signal transmission apparatus shown includes a supervisory signal light transmission unit 101 for transmitting supervisory signal light. The signal light transmission unit 101 includes a laser diode (LD) 102 for emitting supervisory signal light, a laser diode (LD) driver circuit 103 and an automatic power control (APC) circuit 104.

The LD driver circuit 103 outputs driving current for controlling the emission light level of the laser diode 102, and the APC circuit 104 controls the driving current of the LD driver circuit 103 to control the level of supervisory signal light to be emitted from the laser diode 102.

The light signal transmission apparatus further includes a supervisory signal light reception and main signal transmission unit 105 provided in a spaced relationship from the signal light transmission unit 101 and connected to the laser diode 102 by an optical fiber 110. The supervisory signal light reception and main signal transmission unit 105 thus receives signal light from the laser diode 102 on one hand. On the other hand, the supervisory signal light reception and main signal transmission unit 105 multiplexes supervisory signal light, whose level has been controlled, and a main signal and transmits resulting light. To this end, the supervisory signal light reception and main signal transmission unit 105 includes a light branching element 106, a photodiode 107, a main signal outputting element 108 and a wave combiner 109.

The light branching element 106 branches supervisory signal light from the laser diode 102, whose level has been controlled, at a predetermined ratio so that part of the supervisory signal light is outputted to the photodiode 107 while the remaining supervisory signal light is outputted to the wave combiner 109.

The photodiode (PD) 107 is connected to the APC circuit 104 of the supervisory signal light transmission unit 101 via an analog electric signal line 111, and outputs an analog electric signal corresponding to the level of the supervisory signal light branched by the light branching element 106 to the APC circuit 104 via the analog electric signal line 111.

In response to the analog electric signal from the photodiode 107, the APC circuit 104 controls the driving current of the LD driver circuit 103 in response to the analog electric signal from the photodiode 107 so that the level of signal light to be emitted from the laser diode 102 may be fixed.

Accordingly, an automatic power control (APC) loop (or ALC (Automatic Level Control) loop) is formed from the laser diode 102, light branching element 106, photodiode 107, APC circuit 104 and LD driver circuit 103 described above.

The main signal outputting element 108 outputs a light signal as a main signal, and the wave combiner 109 combines the light signal from the main signal outputting element 108 and supervisory signal light branched by the light branching element 106 and having a controlled level and transmits resulting light.

It is to be noted that the optical fiber 110 and the analog electric signal line 111 described above are removably connected, for example, to the supervisory signal light transmission unit 101 side and the supervisory signal light reception and main signal transmission unit 105 side, for example, by means of connectors so that replacement of an apparatus can be performed for each of the supervisory signal light transmission unit 101 and the supervisory signal light reception and main signal transmission unit 105.

With the light signal remote control apparatus having such a construction as described above with reference to FIG. 19, the laser diode 102 of the supervisory signal light transmission unit 101 emits signal light based on driving current from the LD driver circuit 103. The signal light is transmitted to the supervisory signal light reception and main signal transmission unit 105, which is provided in a spaced relationship from the supervisory signal light transmission unit 101, via the optical fiber 110.

The photodiode 107 of the supervisory signal light reception and main signal transmission unit 105 detects the level of the signal light received via the optical fiber 110 as an analog electric signal. The analog electric signal as signal light level detection information is outputted to the APC circuit 104 of the supervisory signal light transmission unit 101 side via the analog electric signal line 111.

The APC circuit 104 controls the driving current of the LD driver circuit 103 in response to the analog electric signal as signal light level detection information from the photodiode 107 to control the level of signal light to be emitted from the laser diode 102.

Consequently, the level of the supervisory signal light emitted from the laser diode 102 is controlled to a fixed level irrespective of the differences in temperature of the supervisory signal light transmission unit 101 and the supervisory signal light reception and main signal transmission unit 105 from their ambient temperature and so forth as factors of a level variation. The supervisory signal light is combined with and transmitted together with signal light as a main signal from the main signal outputting element 108 by and from the wave combiner 109.

However, in such a light signal transmission apparatus to which a light signal remote control apparatus is applied as described above with reference to FIG. 19, where the optical fiber 110 and the analog electric signal line 111 are connected to the supervisory signal light transmission unit 101 side and the supervisory signal light reception and main signal transmission unit 105 side by means of removable connectors or like elements, if one of the connectors is disconnected, then the APC loop is opened, and consequently, the analog electric signal to be inputted from the photodiode 107 to the APC circuit 104 is interrupted.

In particular, if a connector is disconnected, then the level of the electric signal drops, and consequently, the APC circuit 104 recognizes that the level of the supervisory signal light detected by the photodiode 107 has dropped, and controls the LD driver circuit 103 so as to increase the amount of light to be emitted from the laser diode 102.

Consequently, although the light output level of the laser diode 102 itself does not exhibit any drop, since the LD driver circuit 103 supplies such driving current as to increase the amount of light to be emitted, high current flows through the laser diode 102, resulting in deterioration of the reliability of the laser diode 102, which is a subject to be solved of the light signal transmission apparatus described above.

In order to eliminate the deterioration of the reliability of the laser diode 102, removable connectors cannot be used to connect the optical fiber 110 and the analog electric signal line 111 to the supervisory signal light transmission unit 101 side and the supervisory signal light reception and main signal transmission unit 105 side. Consequently, it becomes difficult to replace any apparatus.

Further, since the light detection signal detected by the photodiode 107 is a very low analog electric signal and noise components are mixed into the analog electric signal if the analog electric signal is outputted to the supervisory signal light transmission unit 101 via the analog electric signal line 111, the light signal transmission apparatus has a further subject to be solved in that an accurate light signal level on the reception side cannot be outputted to the APC circuit 104 and the light output level of the laser diode 102 is liable to fluctuate.

SUMMARY OF THE INVENTION

It is an object of the present invention to provide a light signal remote control apparatus and a light signal level controlling method for a light signal remote control apparatus as well as a light signal transmission apparatus and a supervisory signal light level controlling method for a light signal transmission apparatus by which, also where a light transmission unit and a light reception unit are located in a spaced relationship from each other, the light output level can be fixed with a high degree of accuracy and, even when an ALC circuit is opened, a laser diode can emit light at a stable level to assure high reliability of the laser diode.

In order to attain the object described above, according to an aspect of the present invention, there is provided a light signal remote control apparatus, which comprises a light transmission section including a light source for emitting light to be transmitted, a light reception section located in a spaced relationship from the light transmission section and including a first light detection section for receiving the light signal from the light source of the light transmission section via an optical fiber, a first control section for outputting a light control signal for controlling the state of the light signal from the light source in response to light detection information detected by the first light detection section of the light reception section, the first control section being provided in one of the light transmission section and the light reception section, a second light detection section provided in the light transmission section for detecting a light emitting state of the light source, a second control section provided in the light transmission section for outputting a light control signal for controlling the state of the light signal from the light source in response to light detection information detected by the second light detection section, and a switch section provided in the light transmission section for selectively outputting to the light source one of the light control signal from the first control section and the light control signal from the second control section with which the light signal from the light source is controlled lower than that with the other.

With the light signal remote control apparatus described above, even if a supervisory signal light control loop is opened, no excessively high current is allowed to flow through a laser diode used for the light source for light transmission. Consequently, the light source for light transmission can emit light at a stable level. Accordingly, the light signal remote control apparatus is advantageous in that the laser diode as the light source for light transmission is improved in reliability and assurance of the quality.

According to another aspect of the present invention, there is provided a light signal level controlling method for a light signal remote control apparatus which includes a light transmission section including a light source for emitting light to be transmitted, and a light reception section located in a spaced relationship from the light transmission section and including a first light detection section for receiving the light signal from the light source of the light transmission section via an optical fiber, the light signal level controlling method comprising the steps of producing, in response to light detection information detected by the first light detection section of the light reception section, a first light control signal for controlling a state of the light signal from the light source, producing, in the light transmission section, in response to a light emitting state of the light source, a second light control signal for controlling the state of the light signal from the light source, and selectively outputting to the light source one of the light control signal and the light control signal with which the light signal from the light source is controlled lower than that with the other.

With the light signal level controlling method, since one of the first light control signal and the second light control signal with which the level of the light signal from the light source is controlled lower than that with the other is selectively outputted to the light source, the light source for light transmission can be controlled so that the level of signal light to be produced thereby may be fixed. Accordingly, even where the light reception section and the light transmission section are located in a remotely spaced relationship from each other, the light output level can be fixed with a high degree of accuracy. Further, even if the optical fiber is disconnected and consequently a signal light control loop is opened, the light source for light transmission can emit light at a stable level. Accordingly, the light signal remote control apparatus is advantageous also in that a laser diode as the light source for light transmission is improved in reliability and assurance of the quality.

According to a further aspect of the present invention, there is provided a light signal transmission apparatus, which comprises a supervisory signal light production apparatus including a supervisory signal light source for producing supervisory signal light, a transmission apparatus connected to the supervisory signal light production apparatus via an optical fiber for multiplexing signal light as a main signal with the supervisory signal light transmitted thereto from the supervisory signal light source via the optical fiber and transmitting the multiplexed signal light, a light branching section for branching the supervisory signal light transmitted thereto via the optical fiber, a first level detection section for detecting a level of part of the light signal branched by the light branching section, a first level control signal outputting section for outputting, in response to detection information from the first level detection section, a control signal for controlling a level of the supervisory signal light to be produced by the supervisory signal light source, a second level detection section for receiving backward light of the supervisory signal light produced by the supervisory signal light production apparatus and detecting a level of the backward light, a second level control signal outputting section for outputting, in response to detection information from the second level detection section, a control signal for controlling the level of the supervisory signal light to be produced by the supervisory signal light source so as to become higher than the level of the supervisory signal light to be controlled by the control signal from the first level control signal outputting section, a switch section for selecting one of the control signal from the first level control signal outputting section and the control signal from the second level control signal outputting section with which the level of the supervisory signal light is controlled lower than that with the other, and a supervisory signal light control section for controlling the supervisory signal light source in response to control information from the switch section so that the supervisory signal light to be produced by the supervisory signal light source has a fixed level.

With the light signal transmission apparatus, the switch section selects one of the control signal from the first level control signal outputting section and the control signal from the second level control signal outputting section with which the level of the supervisory signal light is controlled lower than that with the other and outputs the selected control signal to the supervisory signal light control section, and the supervisory signal light control section can control the level of the supervisory signal light to be produced by the supervisory signal light source so as to be fixed. Accordingly, even where the light transmission apparatus and the supervisory signal light production apparatus are located in a remotely spaced relationship from each other, the light output level can be fixed with a high degree of accuracy. Further, even if the optical fiber is disconnected and consequently a supervisory signal light control loop is opened, the supervisory signal light source can emit light at a stable level. Accordingly, the light signal transmission apparatus is advantageous also in that a laser diode as the supervisory signal light source is improved in reliability and assurance of the quality.

According to a still further aspect of the present invention, there is provided a supervisory signal light level controlling method for a light signal transmission apparatus which includes a supervisory signal light production apparatus including a supervisory signal light source for producing supervisory signal light, and a transmission apparatus connected to the supervisory signal light production apparatus via an optical fiber for multiplexing signal light as a main signal with the supervisory signal light transmitted thereto from the supervisory signal light production apparatus and transmitting the multiplexed signal light via the optical fiber, the supervisory signal light level controlling methods comprising the steps of detecting a level of the supervisory signal light transmitted via the optical fiber and producing, in response to the detected level, a first control signal for controlling a level of the supervisory signal light, detecting a level of backward light of the supervisory signal light produced by the supervisory signal light production apparatus and producing, in response to the detected level, a second control signal for controlling a level of the supervisory signal light, and controlling the level of the supervisory signal light to be produced by the supervisory signal light source using the first control signal when the level of the supervisory signal light controlled is lower than a value set in advance, but controlling the level of the supervisory signal light to be produced by the supervisory signal light source using the second control signal when the level of the supervisory signal light is higher than the value set in advance.

With the supervisory signal light level controlling method, one of the first control signal and the second control signal with which the level of the supervisory signal light is controlled lower than that with the other is selectively outputted to the supervisory signal light source, the level of the supervisory signal light to be produced by the supervisory signal light source can be controlled so as to be fixed. Accordingly, even where the transmission apparatus and the supervisory signal light production apparatus are located in a remotely spaced relationship from each other, the light output level can be fixed with a high degree of accuracy. Further, even if the optical fiber is disconnected and consequently a supervisory signal light control loop is opened, the supervisory signal light source can emit light at a stable level. Accordingly, the supervisory signal light level controlling method is advantageous also in that a laser diode as the supervisory signal light source is improved in reliability and assurance of the quality.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS a. Aspects of the Invention

Figure 1:
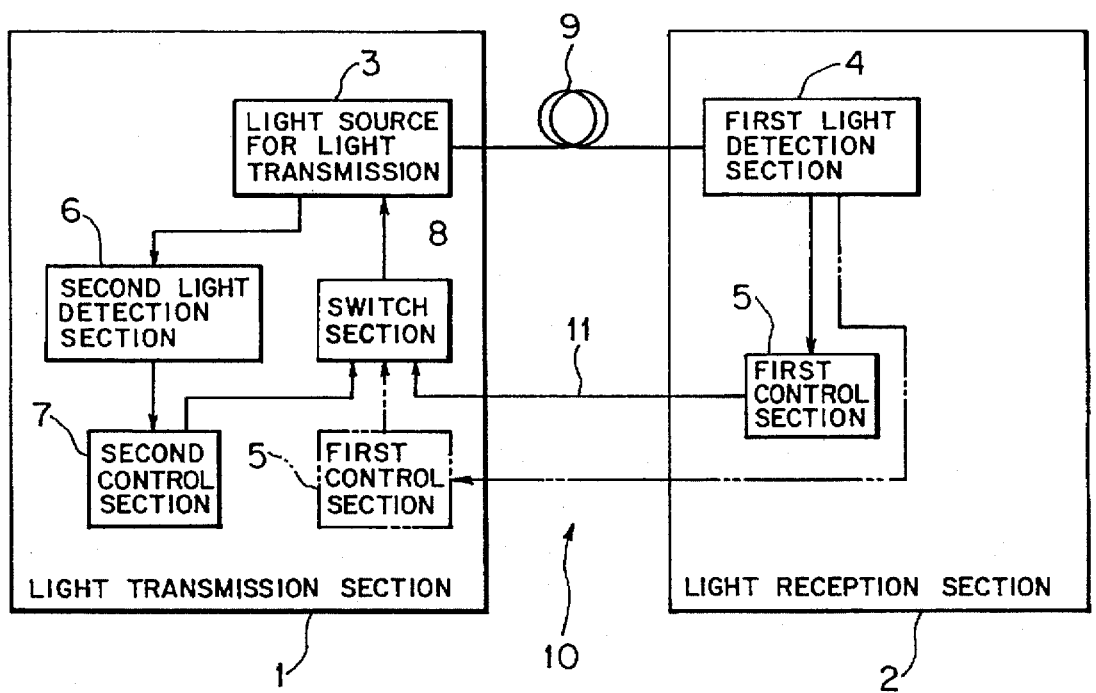
FIGS. 1 and 2 are block diagrams illustrating different aspects of the present invention.

FIG. 1 is a block diagram of a light signal remote control apparatus illustrating an aspect of the present invention. Referring to FIG. 1, the light signal remote control apparatus is generally denoted at 10 and includes a light transmission section 1 including a light source 3 for emitting light to be transmitted, and a light reception section 2 located in a spaced relationship from the light transmission section 1.

The light reception section 2 includes a first light detection section 4 for receiving a light signal from the light source 3 of the light transmission section 1 via an optical fiber 9.

The light signal remote control apparatus 10 further includes a first control section 5 provided in one of the light reception section 2 and the light transmission section 1. The first control section 5 outputs a light control signal for controlling the state of a light signal from the light source 3 in response to light detection information detected by the first light detection section 4 of the light reception section 2.

The light signal remote control apparatus 10 includes, in the light transmission section 1, in addition to the light source 3 mentioned above, a second light detection section 6 for detecting a light emitting state of the light source 3, a second control section 7 for outputting a light control signal for controlling the state of a light signal from the light source 3 in response to light detection information detected by the second light detection section 6, and a switch section 8.

The switch section 8 selectively outputs to the light source 3 one of a light control signal from the first control section 5 and a light control signal from the second control section 7 with which a light signal from the light source 3 is controlled lower than that with the other.

Thus, in the light signal remote control apparatus 10, the first control section 5 produces a first light control signal for controlling the state of a light signal from the light source 3 in response to light detection information detected by the first light detection section 4 of the light reception section 2. Meanwhile, the second control section 7 produces a second light control signal for controlling the state of the light signal from the light source 3 in response to a light emitting state of the light source 3. The switch section 8 selectively outputs to the light source 3 one of the first light control signal and the second light control signal with which the light signal from the light source 3 is controlled lower than that with the other.

Further, the light signal remote control apparatus 10 may be constructed such that, as indicated by solid lines in FIG. 1, the first control section 5 is provided in the light reception section 2, and the light transmission section 1 and the light reception section 2 are interconnected by a control line 11 such that the light control signal from the first control section 5 is inputted to the switch section 8 via the control line 11.

Or, the light signal remote control apparatus 10 may be constructed such that the first light detection section 4 includes a photodiode for detecting a received light signal as an analog electric signal, and the light reception section 2 includes an analog to digital conversion section for converting the analog electric signal as a detection signal from the first light detection section 4 into a digital electric signal and outputting the digital electric signal to the light transmission section 1 while the light transmission section 1 includes a digital to analog conversion section for converting the digital electric signal inputted thereto from the analog to digital conversion section into an analog electric signal, which is inputted to the first control section 5 (refer to chain line in FIG. 1) provided in the light transmission section 1.

Or else, the light signal remote control apparatus may be constructed such that the first light detection section 4 includes a photodiode for detecting a received light signal as an analog electric signal, and the light reception section 2 includes an analog to digital conversion section for converting the analog electric signal as a detection signal from the first light detection section 4 into a digital electric signal and a digital electric signal to light signal conversion section for converting the digital electric signal from the analog to digital conversion section into a light signal and outputting the light signal to the light transmission section 1 via an optical fiber for a detection light signal while the light transmission section 1 includes a light signal to digital electric signal conversion section for converting the light signal from the digital electric signal to light signal conversion section into a digital signal and a digital to analog conversion section for converting the digital electric signal inputted thereto from the light signal to digital electric signal conversion section into an analog electric signal, which is inputted to the first control section 5 provided in the light transmission section 1.

In this instance, the optical fiber for a detection light signal may be common to the optical fiber 9. Thus, the first light control signal can be produced by the first control section 5 of the light reception section 2, and the first light control signal can be multiplexed with the light signal from the light source 3 of the light transmission section 1 and transmitted via the optical fiber 9.

Otherwise, the light signal remote control apparatus may be constructed such that it further includes a clock signal disconnection detection circuit for detecting disconnection of a clock signal inputted to the light transmission section 1, and the clock signal disconnection detection circuit outputs, when disconnection of the clock signal is detected, to the switch section 8 a light control signal for disconnecting the light signal from the light source 3.

Or, the light signal remote control apparatus may be constructed such that the light transmission section 1 includes level variation means for variably controlling the level of the light signal from the light source 3, and control signal selection means for controlling so that, when the level of the light signal from the light source 3 is to be controlled by the level variation means, a control signal from the level variation means is selected preferentially.

Or else, the light signal remote control apparatus may be constructed such that it further includes selection information identification means for receiving the light control signal from the first control section 5 and the light control signal from the second control section 7 as input signals thereto and identifying the light control signal selected by the switch section 8.

Accordingly, with the light signal remote control apparatus described above, even if a supervisory signal light control loop is opened, no excessively high current is allowed to flow through a laser diode used for the light source 3 for light transmission. Consequently, the light source 3 for light transmission can emit light at a stable level. Accordingly, the light signal remote control apparatus is advantageous in that the laser diode as the light source 3 for light transmission is improved in reliability and assurance of the quality.

Further, since the switch section 8 selectively outputs to the light source 3 one of the light control signal from the first control section 5 and the light control signal from the second control section 7 with which the light signal from the light source 3 is controlled lower than that with the other. Consequently, the light source 3 for light transmission can be controlled so that the level of signal light to be produced thereby may be fixed. Accordingly, even where the light reception section 2 and the light transmission section 1 are located in a remotely spaced relationship from each other, the light output level can be fixed with a high degree of accuracy. Further, even if the optical fiber 9 is disconnected and consequently the supervisory signal light control loop is opened, the light source 3 for light transmission can emit light at a stable level. Accordingly, the light signal remote control apparatus is advantageous also in that the laser diode as the light source 3 for light transmission is improved in reliability and assurance of the quality.

Where the first control section 5 is provided in the light reception section 2 and the light control signal from the first control section 5 is outputted via the control line 11, information representative of the level of supervisory signal light detected by the first light detection section 4 can be transmitted in a compressed condition as digital information. Consequently, the loss or noise of the control line 11 can be reduced. Accordingly, the light signal remote control apparatus is advantageous also in that it is superior in accuracy in light power control.

Where the light signal remote control apparatus includes the analog to digital conversion section and the digital to analog conversion section, detection information of the signal light level can be transmitted as a digital signal via a digital signal light. Consequently, detection information can be transmitted suppressing noise components comparing with an alternative case wherein the detection information is transmitted via an analog electric signal line, and the first control section 5 need not be provided in the light reception section 2. Accordingly, the light reception section can be simplified in construction.

Where the light signal remote control apparatus includes, on the light reception section 2 side, the analog to digital conversion section and the digital electric signal to light signal conversion section and includes, on the light transmission section 1 side, the light signal to digital electric signal conversion section and the digital to analog conversion section, detection information of the signal light level can be transmitted as a light signal via the optical fiber 9. Consequently, detection information can be transmitted suppressing noise components comparing with an alternative case wherein the detection information is transmitted via an analog electric signal line, and the first control section 5 need not be provided in the light reception section 2. Accordingly, the light reception section can be simplified in construction.

Further, where the signal light from the light source 3 for light transmission and the light signal as level detection information of the signal light from the digital electric signal to light signal conversion section are wavelength multiplexed or time division multiplexed and transmitted by the optical fiber 9, the number of terminals required to connect the light transmission section 1 and the light reception section 2 to each other can be reduced, and consequently, the connection of the apparatus can be facilitated advantageously. Further, detection information can be transmitted suppressing noise components comparing with an alternative case wherein the detection information is transmitted via an analog electric signal line, and the first control section 5 need not be provided in the light reception section 2. Accordingly, the light reception section can be simplified in construction.

Where the clock signal disconnection detection circuit is provided, when disconnection of a clock signal is detected, the clock signal disconnection detection circuit can output to the switch section 8 a light control signal for disconnecting the light signal from the light source 3 for light transmission. Consequently, the light signal remote control apparatus is advantageous in that, also when the clock signal is disconnected, production of dc current through the laser diode as the light source 3 for light transmission can be prevented.

Where the light signal remote control apparatus includes the level variation means and the control signal selection means, even if a reference value voltage to be used for APC control by the first control section 5, for example, in an initial state, is not set, a reference value voltage with which the light output level can be controlled to an optimum light output level in a condition wherein the first control section 5 remains inoperative can be set. Particularly since emission of excessive light in an initial state can be suppressed, the light signal remote control apparatus is advantageous also in that the laser diode as the light source 3 for light transmission is improved in reliability and assurance of the quality.

Where the light signal remote control apparatus further includes the selection information identification means, an irregular condition of a control mode by the first control section 5 can be found out at an early stage. Consequently, a suitable countermeasure against the irregular condition can be taken quickly, which contributes to improvement in reliability of the apparatus.

Figure 2:
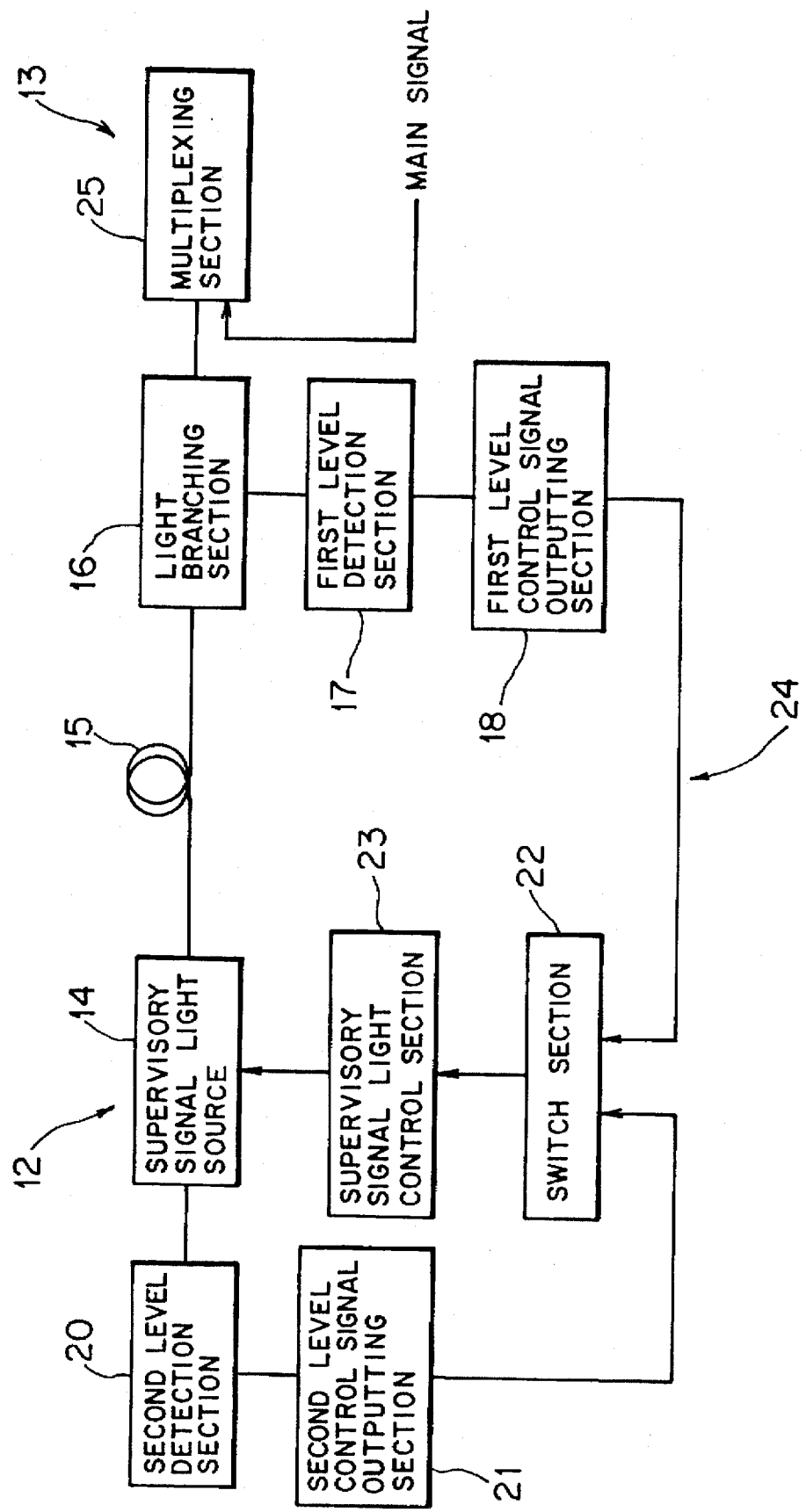

Referring now to FIG. 2, there is shown in block diagram a light signal transmission apparatus according to another aspect of the present invention. The light signal transmission apparatus is denoted at 24 and includes a supervisory signal light production apparatus 12 including a supervisory signal light source 14 for producing supervisory signal light, and a transmission apparatus 13.

The transmission apparatus 13 is connected to the supervisory signal light production apparatus 12 via an optical fiber 15, and multiplexes, by means of a multiplexing section 25 thereof, a light signal as a main signal with supervisory signal light transmitted thereto from the supervisory signal light source 14 via the optical fiber 15 and transmits the multiplexed signal light.

The light signal transmission apparatus further includes a light branching section 16 for branching the supervisory signal light transmitted thereto via the optical fiber 15, a first level detection section 17 for detecting a level of part of the light signal branched by the light branching section 16, and a first level control signal outputting section 18 for outputting, in response to detection information from the first level detection section 17, a control signal for controlling a level of the supervisory signal light to be produced by the supervisory signal light source 14.

The light signal transmission apparatus further includes a second level detection section 20 for receiving backward light of the supervisory signal light produced by the supervisory signal light production apparatus 12 and detecting a level of the backward light.

The light signal transmission apparatus further includes a second level control signal outputting section 21 for outputting, in response to detection information from the second level detection section 20, a control signal for controlling the level of the supervisory signal light to be produced by the supervisory signal light source 14 so as to become higher than the level of the supervisory signal light to be controlled by the control signal from the first level control signal outputting section 18.

In other words, the set light power by the second level control signal outputting section 21 is set higher than the set light power set in response to the control signal from the first level control signal outputting section 18.

The light signal transmission apparatus further includes a switch section 22 for selecting one of the control signal from the first level control signal outputting section 18 and the control signal from the second level control signal outputting section 21 with which the level of the supervisory signal light is controlled lower than that with the other.

The light signal transmission apparatus further includes a supervisory signal light control section 23 for controlling the supervisory signal light source 14 in response to control information from the switch section 22 so that the supervisory signal light to be produced by the supervisory signal light source 14 has a fixed level.

Then, in the light signal transmission apparatus 24, level control is performed in the following manner.

In particular, the first level detection section 17 detects a level of the supervisory signal light transmitted via the optical fiber 15, and the first level control signal outputting section 18 produces, in response to the detected level, a first control signal for controlling a level of the supervisory signal light.

Further, the second level detection section 20 detects a level of backward light of the supervisory signal light produced by the supervisory signal light production apparatus 12, and the second level control signal outputting section 21 produces, in response the detected level, a second control signal for controlling a level of the supervisory signal light.

The supervisory signal light control section 23 controls the level of the supervisory signal light to be produced by the supervisory signal light source 14 using the first control signal selected by the switch section 22 when the level of the supervisory signal light controlled is lower than a value set in advance, but controls the level of the supervisory signal light to be produced by the supervisory signal light source 14 using the second control signal selected by the switch section 22 when the level of the supervisory signal light is higher than the value set in advance.

The method may be constructed such that the first control signal is produced as a light signal by the transmission apparatus 13 and the light signal produced is multiplexed with the supervisory signal light from the supervisory signal light production apparatus 12 and outputted to the supervisory signal light production apparatus 12 via the optical fiber 15.

Or, the method may be constructed such that the value set in advance is a level of the supervisory signal light produced by the supervisory signal light source 14 using the second control signal.

Accordingly, with the light signal transmission apparatus and the supervisory signal light level controlling method, the switch section 22 selects one of the control signal from the first level control signal outputting section 18 and the control signal from the second level control signal outputting section 21 with which the level of the supervisory signal light is controlled lower than that with the other and outputs the selected control signal to the supervisory signal light control section 23, and the supervisory signal light control section 23 can control the level of the supervisory signal light to be produced by the supervisory signal light source 14 so as to be fixed. Accordingly, even where the light transmission apparatus 13 and the supervisory signal light production apparatus 12 are located in a remotely spaced relationship from each other, the light output level can be fixed with a high degree of accuracy. Further, even if the optical fiber 15 is disconnected and consequently a supervisory signal light control loop is opened, the supervisory signal light source 14 can emit light at a stable level. Accordingly, the light signal transmission apparatus and the supervisory signal light level controlling method are advantageous also in that the laser diode as the supervisory signal light source 14 is improved in reliability and assurance of the quality.

Further, with the light signal transmission apparatus and the supervisory signal light level controlling method, where the supervisory signal light from the supervisory signal light source 14 and the light signal as level detection information of the signal light from the digital electric signal to light signal conversion section are wavelength multiplexed or time division multiplexed and transmitted by the optical fiber 15, the number of terminals required to connect the supervisory signal light production apparatus 12 and the transmission apparatus 13 to each other can be reduced, and consequently, the connection of the apparatus can be facilitated advantageously. Further, detection information can be transmitted suppressing noise components comparing with an alternative case wherein the detection information of the level of the supervisory signal light is transmitted via an analog electric signal line, and the first level control signal outputting section 18 need not be provided in the transmission apparatus 13. Accordingly, the transmission apparatus 13 can be simplified in construction.

b. First Embodiment

Figure 3:
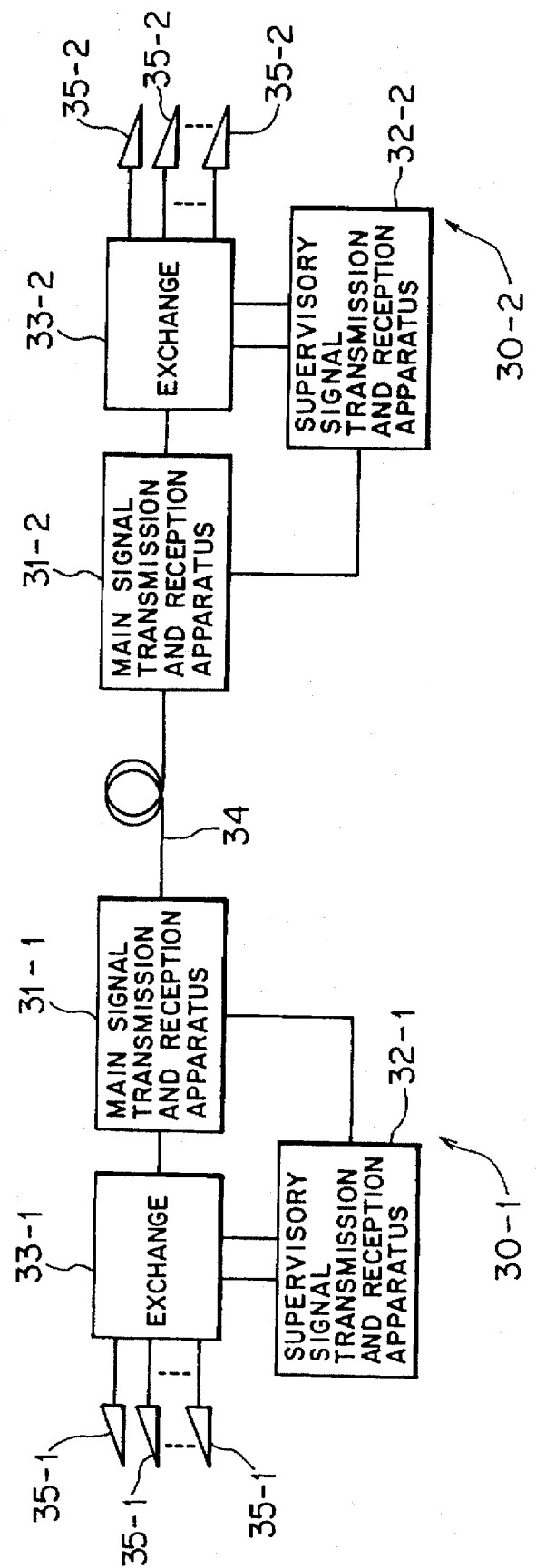
FIG. 3 is a block diagram showing an optical communication system applied to a first embodiment of the present invention.

FIG. 3 shows in block diagram an optical communication system to which a light signal transmission and reception apparatus according to a first preferred embodiment of the present invention is applied. Referring to FIG. 3, the optical communication system shown includes a pair of light signal transmission and reception apparatus 30-1 and 30-2 connected to each other by an optical fiber 34.

The light signal transmission and reception apparatus 30-1 includes a main signal transmission and reception apparatus 31-1, a supervisory signal transmission and reception apparatus 32-1, and an exchange 33-1 connected to the supervisory signal transmission and reception apparatus 32-1 and the supervisory signal transmission and reception apparatus 32-2 and accommodating a plurality of terminals 35-1.

Similarly, the light signal transmission and reception apparatus 30-2 includes a main signal transmission and reception apparatus 31-2, a supervisory signal transmission and reception apparatus 32-2, and a exchange 33-2 connected to the main signal transmission and reception apparatus 31-2 and the supervisory signal transmission and reception apparatus 32-2 and accommodating a plurality of terminals 35-2.

The main signal transmission and reception apparatus (light reception sections, transmission apparatus) 31-1 and 31-2 are connected to each other by the optical fiber 34 and transmit and receive data as a main signal.

The supervisory signal transmission and reception apparatus (light transmission sections, supervisory signal light production apparatus) 32-1 and 32-2 transmit and receive supervisory signal light. The supervisory signal transmission and reception apparatus 32-1 and 32-2 are located in a spaced relationship from but connected to the main signal transmission and reception apparatus 31-1 and 31-2 via respective optical fibers (optical cables: refer to reference characters 50b and 50d shown in FIG. 4).

The optical fiber interposed between the supervisory signal transmission and reception apparatus 32-1 and the main signal transmission and reception apparatus 31-1 and the optical fiber interposed between the supervisory signal transmission and reception apparatus 32-2 and the main signal transmission and reception apparatus 31-2 are removably connected by means of connectors or like elements.

Upon transmission of a main signal from the main signal transmission and reception apparatus 31-1, it multiplexes and transmits signal light as the main signal and supervisory signal light transmitted thereto from the supervisory signal transmission and reception apparatus 32-1 via the corresponding optical fiber. On the other hand, upon reception of a signal from the main signal transmission and reception apparatus 31-2, a main signal component is received by the main signal transmission and reception apparatus 31-1 while a supervisory signal component is received by the supervisory signal transmission and reception apparatus 32-1.

Similarly, upon transmission of a main signal from the main signal transmission and reception apparatus 31-2, it multiplexes and transmits signal light as the main signal and supervisory signal light transmitted from the supervisory signal transmission and reception apparatus 32-2 via the corresponding optical fiber. On the other hand, upon reception of a signal from the main signal transmission and reception apparatus 31-1, a main signal component is received by the main signal transmission and reception apparatus 31-2 while a supervisory signal component is received by the supervisory signal transmission and reception apparatus 32-2.

A signal from the main signal transmission and reception apparatus 31-2 or 31-1 received by the main signal transmission and reception apparatus 31-1 or 31-2 is exchanged by the exchange 33-1 or 33-2 and transmitted to a desired terminal 35-1 or 35-2 as a destination of transmission via one of the light signal transmission and reception apparatus in which the desired terminal 35-1 or 35-2 is accommodated.

A light signal as the main signal described above may be formed from a frame of a digital signal. For example, a digital signal having a transmission rate of approximately 10 Gbps and having a wavelength of approximately 1.55 μm can be used.

Also the supervisory signal light may be formed from a frame of a digital signal. For example, a digital signal having a transmission rate of approximately 1.5 Mbps and having a wavelength of 1.52 μm can be used.

Further, supervisory information included in the supervisory signal light described above may include, for example, alarm information for notifying that an apparatus is in an abnormal condition.

It is to be noted that the exchange 33-1 composing the light signal transmission and reception apparatus 30-1 described above can be connected to other main signal transmission and reception apparatus and supervisory signal transmission and reception apparatus than the main signal transmission and reception apparatus 31-1 and the supervisory signal transmission and reception apparatus 32-1. Similarly, the exchange 33-2 composing the light signal transmission and reception apparatus 30-2 described above can be connected to other main signal transmission and reception apparatus and supervisory signal transmission and reception apparatus than the main signal transmission and reception apparatus 31-2 and the supervisory signal transmission and reception apparatus 32.2.

Figure 4:
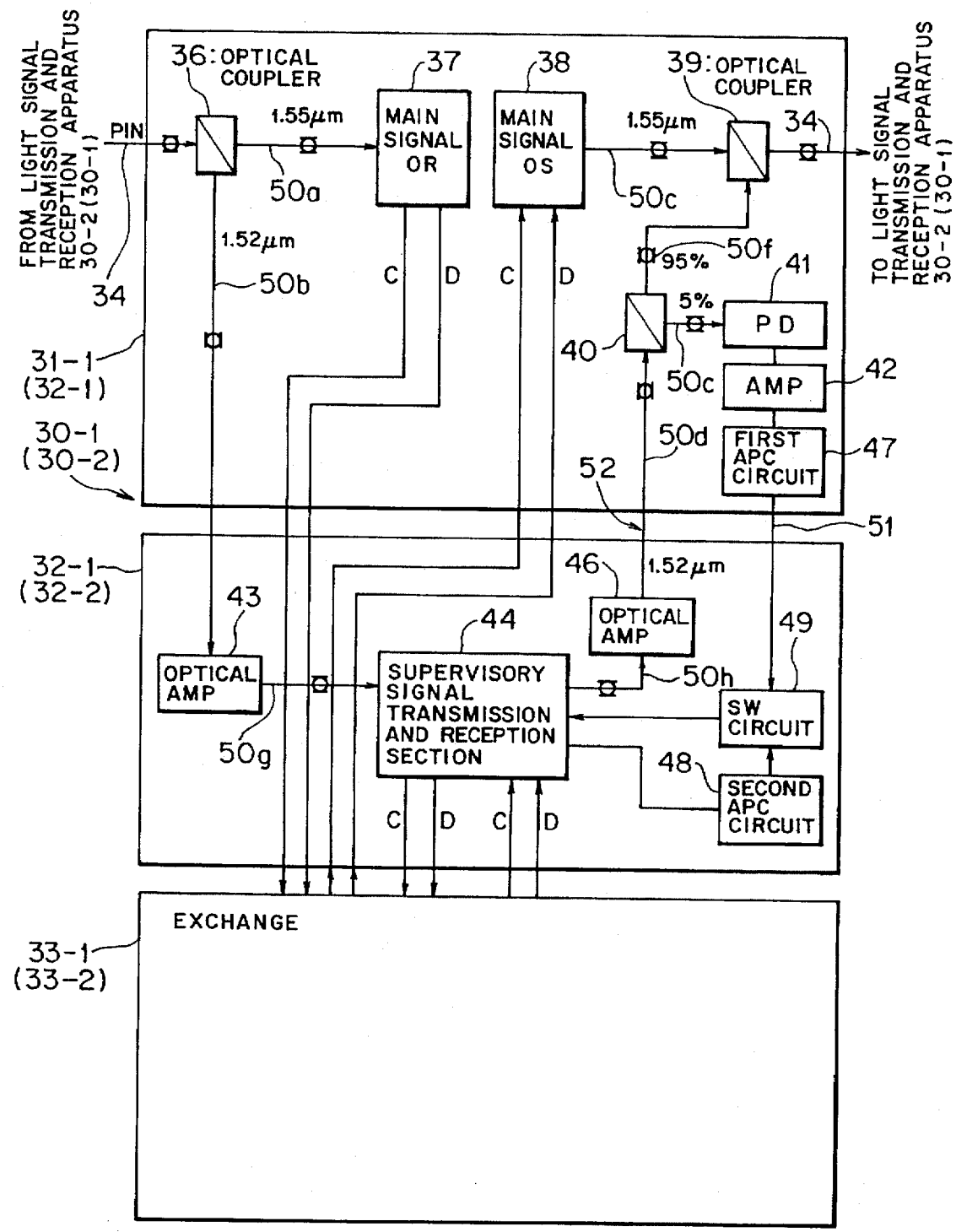
FIG. 4 is a block diagram showing a light signal transmission and reception apparatus according to the first embodiment of the present invention.

The light signal transmission and reception apparatus 30-1 described above particularly has such a construction as shown in FIG. 4. It is to be noted that also the light signal transmission and reception apparatus 30-2 has a similar construction to that of the light signal transmission and reception apparatus 30-1, but a detailed construction of it is omitted in FIG. 4 to avoid redundancy. In particular, the light signal transmission and reception apparatus 30-2 includes the main signal transmission and reception apparatus 31-2 and the supervisory signal transmission and reception apparatus 32-2 similar to those (refer to reference numerals 31-1 and 32-1) of the light signal transmission and reception apparatus 30-1.

Referring to FIG. 4, the main signal transmission and reception apparatus 31-1 includes an optical coupler 36, a main signal reception section 37, a main signal transmission section 38, a pair of optical couplers 39 and 40, a photodiode 41, an amplifier 42 and a first automatic power control (APC) circuit 47.

The optical coupler 36 wavelength demultiplexes a light signal inputted thereto from the main signal transmission and reception apparatus 31-2 as an opposing apparatus via the optical fiber 34 to separate a main signal and a supervisory signal from each other. For example, of the signal light from the main signal transmission and reception apparatus 31-2, signal light having a wavelength of 1.55 μm is outputted as a main signal to the main signal reception section 37 via an optical fiber 50a while signal light having another wavelength of 1.52 μm is outputted as a supervisory signal to the supervisory signal transmission and reception apparatus 32-1 via another optical fiber 50b.

Further, the main signal reception section (OR, Optical Receive) 37 converts signal light inputted thereto as a reception main signal from the optical coupler 36 via the optical fiber 50a into an electric signal which includes a clock component (C) and a data component (D), and outputs the electric signal to the exchange 33-1.

On the other hand, the main signal transmission section (OS, Optical Send) 38 receives a main signal exchanged by the exchange 33-1 (electric signal including a clock component (C) and a data component (D)), converts the electric signal into signal light having a wavelength of approximately 1.55 μm mentioned above, and outputs the signal light.

The optical coupler 39 serves as a multiplexing section, and receives, as inputs thereto, signal light of a main signal component from the main signal transmission section 38 via an optical fiber 50c and signal light (hereinafter referred to as supervisory signal light) of a supervisory signal component from the optical coupler 40 via another optical fiber 50f, combines the received lights and transmits the resulting light to the light signal transmission and reception apparatus 30-2 via the optical fiber 34.

The optical coupler 40 is connected to the supervisory signal transmission and reception apparatus 32-1 via an optical fiber 50d and level branches (optical power branches) supervisory signal light transmitted thereto from the supervisory signal transmission and reception apparatus 32-1 (or 32-2). Part of the branched supervisory signal light (for example, a portion of approximately 5% in level of the inputted light signal) is outputted to the photodiode 41 via an optical fiber 50e while the remaining supervisory signal light (in this instance, a portion of approximately 95% in level of the inputted light signal) is outputted to the optical coupler 39 via the optical fiber 50f.

It is to be noted that supervisory signal light outputted from the optical coupler 40 to the optical coupler 39 has a light output level controlled to a fixed level by a supervisory signal light control loop 52 which will be hereinafter described.

Meanwhile, the photodiode (PD) 41 receives, as an input thereto, part of the supervisory signal light from the optical coupler 40 and converts the supervisory signal light into an electric signal corresponding to the level of the optical power of the supervisory signal light. Consequently, the photodiode 41 has a function as a first level detection element for detecting the level of supervisory signal light. Further, the optical coupler 40 and the photodiode 41 described above have a function as a first light detection section for receiving a light signal from the supervisory signal transmission and reception apparatus 32-1, which will be hereinafter described, via the optical fiber 50d.

The amplifier (AMP) 42 amplifies an electric signal indicative of the level of supervisory signal light detected by the photodiode 41 by a predetermined amplification factor.

The first APC circuit 47 has a function as a first level control signal outputting section (first control section) for receiving, as an input thereto, an electric signal amplified by the predetermined amplification factor by the amplifier 42 and indicative of a level of supervisory signal light detected by the photodiode 41 of the main signal transmission and reception apparatus 31-1 and outputting a control signal (light control signal) for controlling the level of supervisory signal light to be produced by a laser diode 44a of a supervisory signal transmission and reception section 44, which will be hereinafter described. A detailed construction of the first APC circuit 47 will be hereinafter described with reference to FIG. 5.

Figure 5:
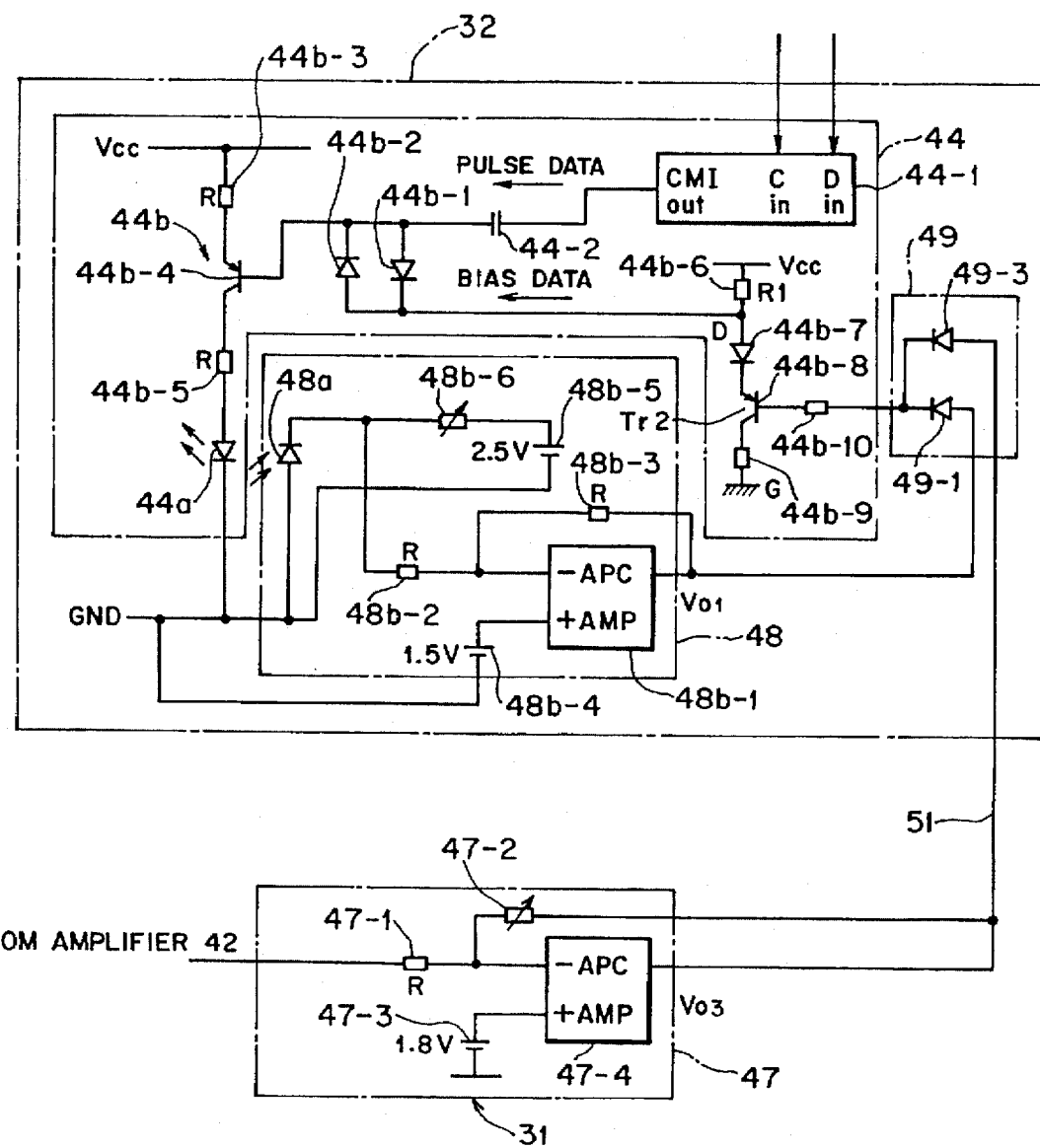
FIG. 5 is a block diagram showing details of a construction of a supervisory signal transmission and reception apparatus and an APC circuit according to the first embodiment of the present invention.

On the other hand, the supervisory signal transmission and reception apparatus 32-1 particularly includes an optical amplification section (optical AMP) 43, a supervisory signal transmission and reception section (OSR, Optical Send Receive) 44, another optical amplification section (optical AMP) 46, a second APC circuit 48 and a switch (SW) circuit 49. Particularly, the supervisory signal transmission and reception section 44, optical amplification section 46, second APC circuit 48 and switch circuit 49 of the supervisory signal transmission and reception apparatus 32-1 and the first APC circuit 47 of the main signal transmission and reception apparatus 31-1 have such a detailed construction as shown in FIG. 5.

It is to be noted that the supervisory signal transmission and reception section 44, optical amplification section 46, optical coupler 40, photodiode 41, amplifier 42, first APC circuit 47, switch circuit 49 and second APC circuit 48 described above form a supervisory signal light control loop (ALC loop) 52 for controlling the level of supervisory signal light to be transmitted from the supervisory signal transmission and reception section 44. The supervisory signal light control loop 52 is particularly shown in FIG. 6.

Referring to FIG. 4, the optical amplification section (optical AMP) 43 amplifies a supervisory signal inputted thereto from the optical coupler 36 via the optical fiber 50b and outputs amplified supervisory signal to the supervisory signal transmission and reception section 44 via an optical fiber 50g.

The supervisory signal transmission and reception section (light source for a light signal, supervisory signal light source, supervisory signal light control section, second light detection section, second level detection section) 44 transmits and receives supervisory signal having a wavelength of approximately 1.52 μm mentioned hereinabove.

In particular, when the supervisory signal transmission and reception section 44 operates as a supervision signal transmission section, it receives, as an input thereto, a signal after conversion processing from the exchange 33-1 (electric signal composed of a clock component (C) and a data component (D)), converts the electric signal into supervisory signal light having a wavelength of approximately 1.52 μm mentioned above, and outputs the supervisory signal light to an optical fiber 50h.

The optical amplification section 46 amplifies the supervision signal light inputted thereto via the optical fiber 50h and outputs the amplified supervision signal light to the main signal transmission and reception apparatus 31-1 via the optical fiber 50d. It is to be noted that the supervision signal light outputted from the supervisory signal transmission and reception section 44 has a light emission level controlled in such a manner as hereinafter described.

In order for the supervisory signal transmission and reception section 44 to operate as a supervisory signal transmission section, it includes, for example, as shown in FIG. 5, a laser diode 44a serving as a supervisory signal light source (light source for optical transmission) for producing a supervisory signal and a laser diode (LD) driving circuit 44b as well as a coded mark inversion (CMI) coding apparatus 44-1 and a capacitor 44-2.

It is to be noted that the absolute maximum rating of the light output level of the laser diode 44a mentioned above may be set to, for example, approximately +2.0 dBm.

The CMI coding apparatus 44-1 functions as an interface between the exchange 33-1 and the supervisory signal transmission and reception section 44, and CMI (Coded Mark Inversion codes) codes a signal exchanged by and inputted from the exchange 33-1 and outputs a resulting code as pulse data.

The LD driving circuit 44b has a function as a supervisory signal light control section for controlling the laser diode 44a so that the level of supervisory signal light to be produced by the laser diode 44a may be fixed in response to control information from the switch circuit 49. To this end, the LD driving circuit 44b includes a pair of pulse amplitude setting diodes 44b-1 and 44b-2, a resistor 44b-3, a bipolar transistor 44b-4, further resistors 44b-5 and 44b-6, a diode 44b-7, another bipolar transistor 44b-8 and still further resistors 44b-9 and 44b-10.

The switch circuit 49 is connected to the bipolar transistor 44b-8 via the resistor 44b-10. The emitter terminal of the bipolar transistor 44b-8 is connected to the pulse amplitude setting diodes 44b-1 and 44b-2 via the diode 44b-7, and a voltage Vcc is applied to the emitter terminal of the bipolar transistor 44b-8 via the diode 44b-7 and the resistor 44b-6. The collector terminal of the bipolar transistor 44b-8 is grounded via the resistor 44b-9.

Accordingly, bias data as detection information from the switch circuit 49 (data for controlling the level of light to be emitted from the laser diode 44a) are inputted to the pulse amplitude setting diodes 44b-1 and 44b-2.

Meanwhile, pulse data from the CMI coding apparatus 44-1 are inputted to the capacitor 44-2 so that pulse current (current in a direction from the diode 44b-1 to the diode 44b-7 or current in a direction from the diode 44b-2 to the CMI coding apparatus 44-1) flows through the pulse amplitude setting diode 44b-1 or 44b-2 and is inputted as pulse data having a set amplitude to the base terminal of the bipolar transistor 44b-4.

More particularly, where the voltage of the signal inputted to the base terminal of the bipolar transistor 44b-4 is represented by $V_{b\ 1}$, the output voltage of switch circuit 49 by $V\rho$, the voltage between the base and emitter terminals of the bipolar transistor 44b-8 by $V_{B\ E}$, and the voltage across the diode 44b-7 by $V_{D\ 1}$, $V_{b\ 1}$ can be represented using $V\rho$, $V_{B\ E}$ and $V_{D\ 1}$ as an equation (A) given below:

$$V_{b\ 1}=V\rho+V_{B\ E}+V_{D\ 1} \tag{A}$$

where $V_{B\ E}$ and $V_{D\ 1}$ are fixed voltages (for example, 1.4V), and $V_{b\ 1}$ is determined based on the value of $V\rho$.

Consequently, as electric current flows through the laser diode 44a with an electric current value corresponding to pulse data inputted to the base terminal of the bipolar transistor 44b-4, the LD driving circuit 44b can drive the laser diode 44a so that the laser diode 44a emits light with a light level conforming to the control information from the switch circuit 49.

On the other hand, when the supervisory signal transmission and reception section 44 operates as a supervisory signal reception section, it converts signal light inputted thereto as a reception supervisory signal via the optical fiber 50g into an electric signal composed of a clock component (C) and a data component (D) and outputs the electric signal to the exchange 33-1. In order for the supervisory signal transmission and reception section 44 to operate as a supervision signal reception section, it includes a photodiode or the like not shown for converting a light signal into an electric signal.

The first APC circuit 47 of the main signal transmission and reception apparatus 31-1 includes, as particularly shown in FIG. 5, a resistor 47-1, an output voltage setting variable resistor 47-2, a reference voltage setting power supply 47-3 having an electric motive force of, for example, approximately 1.8V, and an APC amplifier 47-4 formed from a differential amplifier or the like.

A voltage of approximately 1.8V from the power supply 47-3 is inputted as a reference voltage to the positive input terminal of the APC amplifier 47-4 while an electric signal from the amplifier 42 representative of the level of supervisory signal light is inputted to the negative input terminal of the APC amplifier 47-4. Consequently, the APC amplifier 47-4 outputs a voltage signal $V_{O\ 3}$ as a control signal for controlling the level of the supervisory signal light.

The second APC circuit 48 includes a photodiode 48a serving as a second light detection section for detecting a light emission condition of the laser diode 44a, an APC amplifier 48b-1 formed from a differential amplifier or the like, resistors 48b-2 and 48b-3, a power supply 48b-4 having an electro motive force of, for example, approximately 1.5V, another power supply 48b-5 having an electro motive force of, for example, approximately 2.5V, and an output voltage setting variable resistor 48b-6.

The photodiode 48a has a function as a second level detection section (second light detection section) for receiving backward light of supervisory signal light emitted (produced), for example, from the laser diode 44a of the supervisory signal transmission and reception section 44 and outputting an electric signal corresponding to the level of the received backward light.

The APC amplifier 48b-1, resistors 48b-2 and 48b-3, reference voltage setting power supply 48b-4, power supply 48b-5 and variable resistor 48b-6 have a function as a second level control signal outputting section (second control section) for outputting a voltage signal $V_{O\ 1}$ as a control signal for controlling the laser diode 44a so that the level of supervisory signal light produced by the laser diode 44a may be higher than the level of supervisory signal light controlled by a control signal (voltage signal $V_{O\ 3}$) from the first APC circuit 47 in response to detection information from the photodiode 48a.

More particularly, a voltage of approximately 1.5V from the power supply 48b-4 is inputted as a reference voltage to the positive terminal of the APC amplifier 48b-1 while an electric signal representative of the level of backward light of supervisory signal light is inputted to the negative terminal of the APC amplifier 48b-1. The APC amplifier 48b-1 thus outputs a voltage signal $V_{O\ 1}$ as a control signal for controlling the level of the supervisory signal light.

In particular, the second APC circuit 48 has a function as a second level control signal outputting section for outputting a control signal for controlling the laser diode 44a so that the level of supervisory signal light to be produced by the laser diode 44a may be higher than the level of supervisory signal light controlled by a control signal from the first APC circuit 47 in response to detection information from the photodiode 48a.

In other words, the set light power by the second APC circuit 48 is set higher than the set light power by the first APC circuit 47.

The switch circuit (SW) 49 is connected to the first APC circuit 47 of the main signal transmission and reception apparatus 31-1 via a control line 51 so that a control signal from the first APC circuit 47 is inputted thereto via the control line 51. The switch circuit 49 further receives a control signal from the second APC circuit 48 as another input thereto.

The switch circuit 49 has a function as a switching section for selecting one of the two control signals which makes the level of supervisory signal light after control lower (in other words, the level of supervisory signal light detected by the optical coupler 40) and outputting the selected control signal to the LD driving circuit 44b. As shown in FIG. 5, the switch circuit 49 includes diodes 49-1 and 49-3 which connect a control signal from the first APC circuit 47 and another control signal from the second APC circuit 48 in parallel, respectively.

A voltage signal $V_{O\,3}$ as a control signal from the first APC circuit 47 is inputted to the diode 49-3 while another voltage signal $V_{O\,1}$ as a control signal from the second APC circuit 48 is inputted to the diode 49-1, and a lower one of output terminal voltages of the diodes 49-1 and 49-3 is outputted as a voltage signal from the switch circuit 49. Consequently, a control signal is selected so that the level of supervisory signal light emitted from the laser diode 44a may be lower.

For example, when the supervisory signal light control loop 52 is in a closed loop condition wherein the main signal transmission and reception apparatus 31-1 and the supervisory signal transmission and reception apparatus 32-1 are connected to each other by the optical fibers 50b and 50d described above, the switch circuit 49 selectively outputs the control signal from the first APC circuit 47 which has a lower voltage value than the control signal from the second APC circuit 48.

If any one of the connectors for connecting the optical fibers 50b and 50d to the main signal transmission and reception apparatus 31-1 and the supervisory signal transmission and reception apparatus 32-1 is disconnected to put the supervisory signal light control loop 52 into an open loop condition, the voltage signal $V_{O\,3}$ from the first APC circuit 47 rises, and if the voltage signal $V_{O\,3}$ becomes higher than the voltage $V_{O\,1}$, the switch circuit 49 now selectively outputs the control signal (voltage value $V_{O\,1}$) from the second APC circuit 48.

In the light signal transmission and reception apparatus 30-1 in the first embodiment of the present invention having the construction described above, when it operates as a light signal reception apparatus for receiving a light signal from the light signal transmission and reception apparatus 30-2, the light signal from the light signal transmission and reception apparatus 30-2 is inputted via the optical fiber 34A to the optical coupler 36, by which it is wavelength demultiplexed to separate main signal light (1.55 μm in wavelength) and supervisory signal light (1.52 μm in wavelength) from each other.

The thus separated main signal is received by the main signal reception section 37, by which it is converted into an electric signal composed of a clock component (C) and a data component (D). The electric signal is outputted to the exchange 33-1. Meanwhile, the separated supervisory signal light is amplified by the optical amplification section 43 of the supervisory signal transmission and reception apparatus 32-1 and received by the supervisory signal transmission and reception section 44, by which it is converted into an electric signal composed of a clock component (C) and a data component (D). Also the electric signal is outputted to the exchange 33-1.

Thereafter, the exchange 33-1 performs an exchanging operation based on the main signal and the supervisory signal inputted thereto so that the signal from the light signal transmission and reception apparatus 30-2 is transmitted to a desired one of the terminals 35-1. It is to be noted that, when the supervisory signal from the light signal transmission and reception apparatus 30-2 is inputted to the exchange 33-1, the exchange 33-1 can recognize supervision information included in the supervisory signal.

On the other hand, when the light signal transmission and reception apparatus 30-1 operates as a light signal transmission apparatus for transmitting a signal exchanged by the exchange 33-1 to the light signal transmission and reception apparatus 30-2 as an opposing apparatus, it operates in the following manner.

In particular, the main signal transmission section 38 receives, as an input thereto, a main signal (electric signal) after exchanging processing from the exchange 33-1 and converts the main signal into signal light having a wavelength of approximately 1.55 μm. Meanwhile, the supervisory signal transmission and reception section 44 receives, as an input thereto, a supervisory signal (electric signal) after exchanging processing and converts the supervisory signal into signal light having a wavelength of approximately 1.52 μm.

Meanwhile, the optical coupler 39 combines a main signal from the main signal transmission section 38 and a supervisory signal from the supervisory signal transmission and reception section 44 and transmits a resulting signal to the main signal transmission and reception apparatus 31-2 of the light signal transmission and reception apparatus 30-2 via the optical fiber 34. The level of the supervisory signal from the supervisory signal transmission and reception section 44 is controlled in such a manner as described below by the supervisory signal light control loop 52.

The photodiode 41 detects the level of supervisory signal light transmitted via the optical fiber 50d from supervisory signal light separated by the optical coupler 40. Meanwhile, the first APC circuit 47 produces a first control signal (voltage value $V_{O\,3}$) for controlling the level of supervisory signal light in response to an electric signal from the amplifier 42 representative of the level of the supervisory signal light detected by the photodiode 41.

The photodiode 48a of the second APC circuit 48 detects the level of backward light of supervisory signal light produced by the laser diode 44a of the supervisory signal transmission and reception section 44 and outputs a second control signal (voltage value $V_{O\,1}$) for controlling the level of the supervisory signal light in response to the detected level.

Further, in the switch circuit 49, a control signal from the first APC circuit 47 is inputted to the diode 49-1 while another control signal from the second APC circuit 48 is inputted to the diode 49-3. The switch circuit 49 thus determines that one of the two control signals which is higher in voltage, that is, that one of the control signals which makes the level of the supervisory signal light after controlled lower, is effective and outputs the effective control signal to the LD driving circuit 44b.

In other words, when the level of the supervisory signal light after controlled is lower than a predetermined value (level of the supervisory signal light produced by the laser diode 44a using the control signal from the second APC circuit 48) set in advance, the switch circuit 49 performs feedback control using the control signal from the first APC circuit 47 so that the level of the supervisory signal light to be produced by the laser diode 44a may be fixed.

On the other hand, when the level of the supervisory signal light after controlled is higher than the predetermined value mentioned above, the switch circuit 49 controls the laser diode 44a using the control signal from the second APC circuit 48 so that the level of the supervisory signal light to be produced by the laser diode 44a may be fixed.

Figure 7:
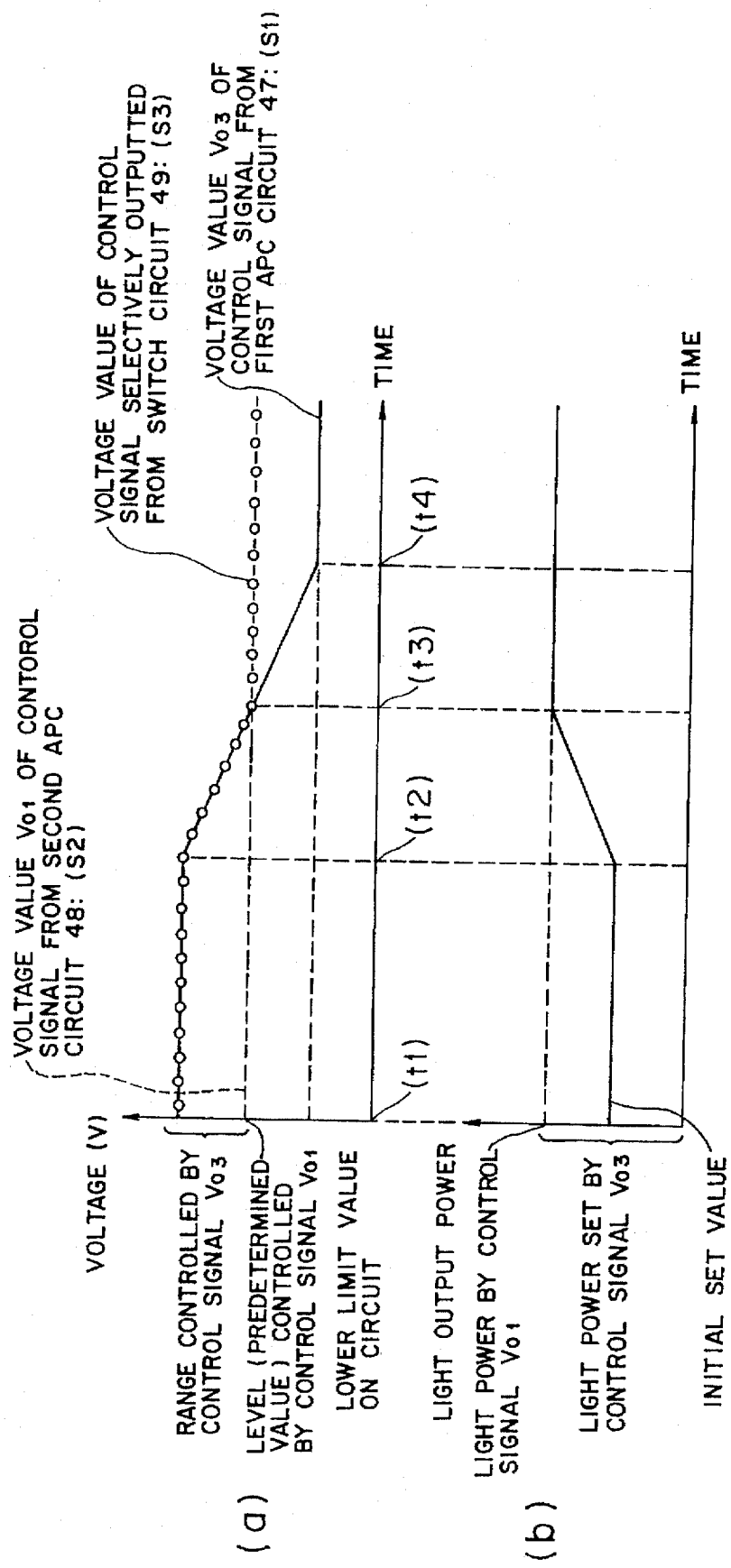
FIGS. 7($a$) and 7($b$) are time charts illustrating operation of the light signal transmission and reception apparatus according to the first embodiment of the present invention.

In particular, when the supervisory signal light control loop 52 is in a closed loop condition, that is, in an ordinary operation, the switch circuit 49 selects, for example, as seen from the time chart of FIG. 7(a), the voltage signal $V_{O\,3}$ (signal S2) from the first APC circuit 47 which is set lower than the voltage signal $V_{O\,1}$ (signal S2) from the second APC circuit 48 (refer to signal S3 from time point t1 to time point t2) so that the laser diode 44a can output a light signal of a light output level of, for example, ±0.0 dBm.

However, if any one of the connectors for connecting the optical fibers 50b and 50d to the main signal transmission and reception apparatus 31-1 and the supervisory signal transmission and reception apparatus 32-1 is disconnected or one of the optical fibers 50b and 50d is disconnected to put the supervisory signal light control loop 52 into an open loop condition, no light is inputted to the photodiode 41 of the main signal transmission and reception apparatus 31-1 any more.

Consequently, the voltage value $V_{O\,3}$ of the control signal from the first APC circuit 47 rises (refer to the signal S2 within a period from time point t2 to time point t4), and the laser diode 44a, is controlled in a direction to raise the level of the received light of the photodiode 41.

Thereafter, if the voltage value $V_{O\,1}$ of the control signal from the second APC circuit 48 becomes lower than the voltage signal $V_{O\,1}$ from the first APC circuit 47, then the switch circuit 49 now selectively outputs the control signal from the second APC circuit 48 so that the laser diode 44a can output a light signal of a light output level of, for example, +1.0 dBm (refer to time point t3 et seq.).

Consequently, as seen from FIG. 7(b), in an ordinary operation, the switch circuit 49 selectively outputs the control signal from the first APC circuit 47 set in advance so as to make the light power lower in order to control the light power of the laser diode 44a (refer to time points t1 to t3), but if the light power controlled by the control signal from the first APC circuit 47 exceeds the light power controlled by the second APC circuit 48, the light power of the laser diode 44a is controlled by the second APC circuit 48 (refer to time point t3 et seq.).

In particular, limiter control is performed by the second APC circuit 48 so that the light power, for example, in the event of disconnection of a connector rises excessively to deteriorate the durability of the laser diode 44a.

In other words, also when the supervisory signal light control loop 52 is put into an open loop condition, since the control mode changes over from supervisory signal light control based on the first APC circuit 47 to supervisory light control based on the second APC circuit 48, excessively high current is prevented from flowing through the laser diode 44a to thus prevent, even when the rating output of the laser diode 44a is set to, for example, approximately +2.0 dBm, the laser diode 44a from emitting excessive light higher than the rating level.

Thus, with the light signal transmission and reception apparatus according to the first embodiment of the present invention, since the switch circuit 49 selects that one of the control signal from the first APC circuit 47 and the control signal from the second APC circuit 48 which makes the level of the supervisory signal light after controlled lower and outputs the selected control level to the LD driving circuit 44b, the LD driving circuit 44b can control the laser diode 44a so that the level of the supervisory signal light to be produced by the laser diode 44a may be fixed. Consequently, the light signal transmission and reception apparatus is advantageous in that, even where the main signal transmission and reception apparatus 31-1 (31-2) and the supervisory signal transmission and reception apparatus 32-1 (32-2) are located at positions spaced away from each other, the light output level can be fixed with a high degree of accuracy. Further, even if any of the optical fibers 50b and 50d is disconnected to open the supervisory signal light control loop 52, the laser diode 44a can be controlled to emit light with a stable level. Consequently, the light signal transmission and reception apparatus is further advantageous in that the reliability of the laser diode is improved and a high quality of the laser diode can be maintained.

Further, since the first APC circuit 47 is provided in the main signal transmission and reception apparatus 31-1 (31-2) and outputs the control signal from the first APC circuit 47 via the control line 51, information indicative of the supervisory signal light level detected by the photodiode 41 can be compressed and transmitted as digital information via the control line 51, and consequently, the loss and noise of the control line can be reduced. Accordingly, the light signal transmission and reception apparatus is further advantageous in that it is superior in accuracy in light power control.

It is to be noted that, while, in the embodiment described above, the first APC circuit 47 is provided in the main signal transmission and reception apparatus 31-1 (31-2), the location of the first APC circuit 47 is not limited to this, and the first APC circuit 47 may be provided in the supervisory signal transmission and reception apparatus 32-1 (32-2). Also the thus modified arrangement is advantageous at least in that, since the laser diode 44a can be controlled to emit light at a stable level without flowing excessive current through the laser diode 44a even when one of the optical fibers 50b and 50d is disconnected to open the supervisory signal light control loop 52, improvement in reliability and assurance of a high quality of the laser diode can be achieved.

b1. First Modification to the First Embodiment

Figure 8:
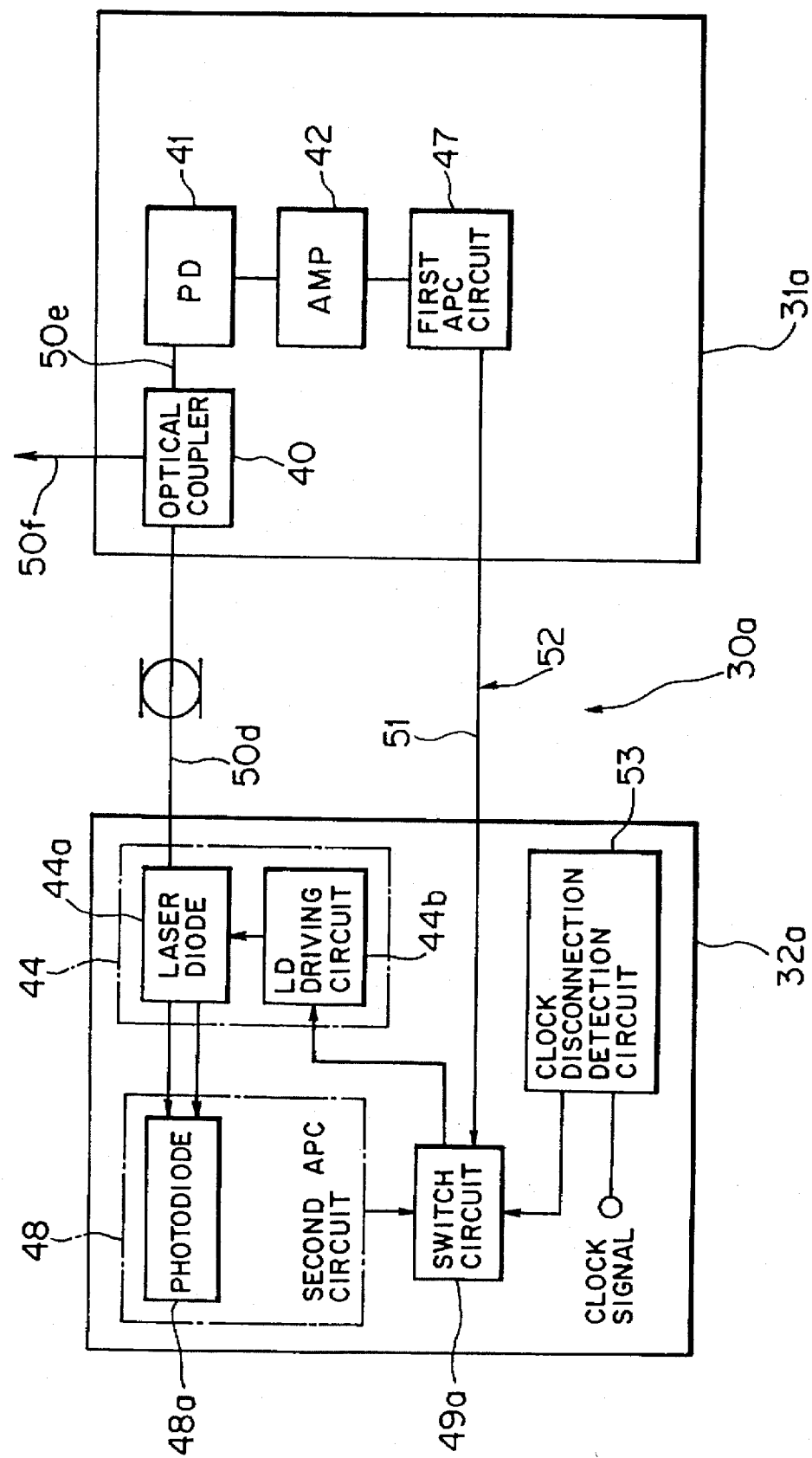
FIG. 8 is a block diagram showing the supervisory signal light control loop of a light signal transmission and reception apparatus according to a first modification to the first embodiment of the present invention.

FIG. 8 shows in block diagram a light signal transmission and reception apparatus according to a first modification to the first embodiment of the present invention, and specifically shows a construction of the supervisory signal light control loop 52. Also the light signal transmission and reception apparatus 30a shown in FIG. 8 can be applied, similarly as in the first embodiment described above, to such an optical communication system as shown in FIG. 3.

In particular, the optical communication system shown in FIG. 3 can be modified such that, in place of the light signal transmission and reception apparatus 30-1 or the light signal transmission and reception apparatus 30-2, the light signal transmission and reception apparatus 30a shown in FIG. 8 is connected to the exchange 33-1 (33-2) and the two light signal transmission and reception apparatus are connected to each other by the optical fiber 34.

Referring to FIG. 8, the light signal transmission and reception apparatus 30a shown is basically similar in construction to that in the first embodiment described hereinabove except that it includes a shut down (S-DOWN) circuit 53 for compulsorily shutting down the light output from the laser diode 44a if disconnection of a clock signal inputted to the supervisory signal transmission and reception apparatus denoted at 32a is detected and the switch circuit 49a has a different construction. It is to be noted that like reference characters in FIG. 8 to those of FIGS. 4 to 6 denote like elements.

Figure 9:
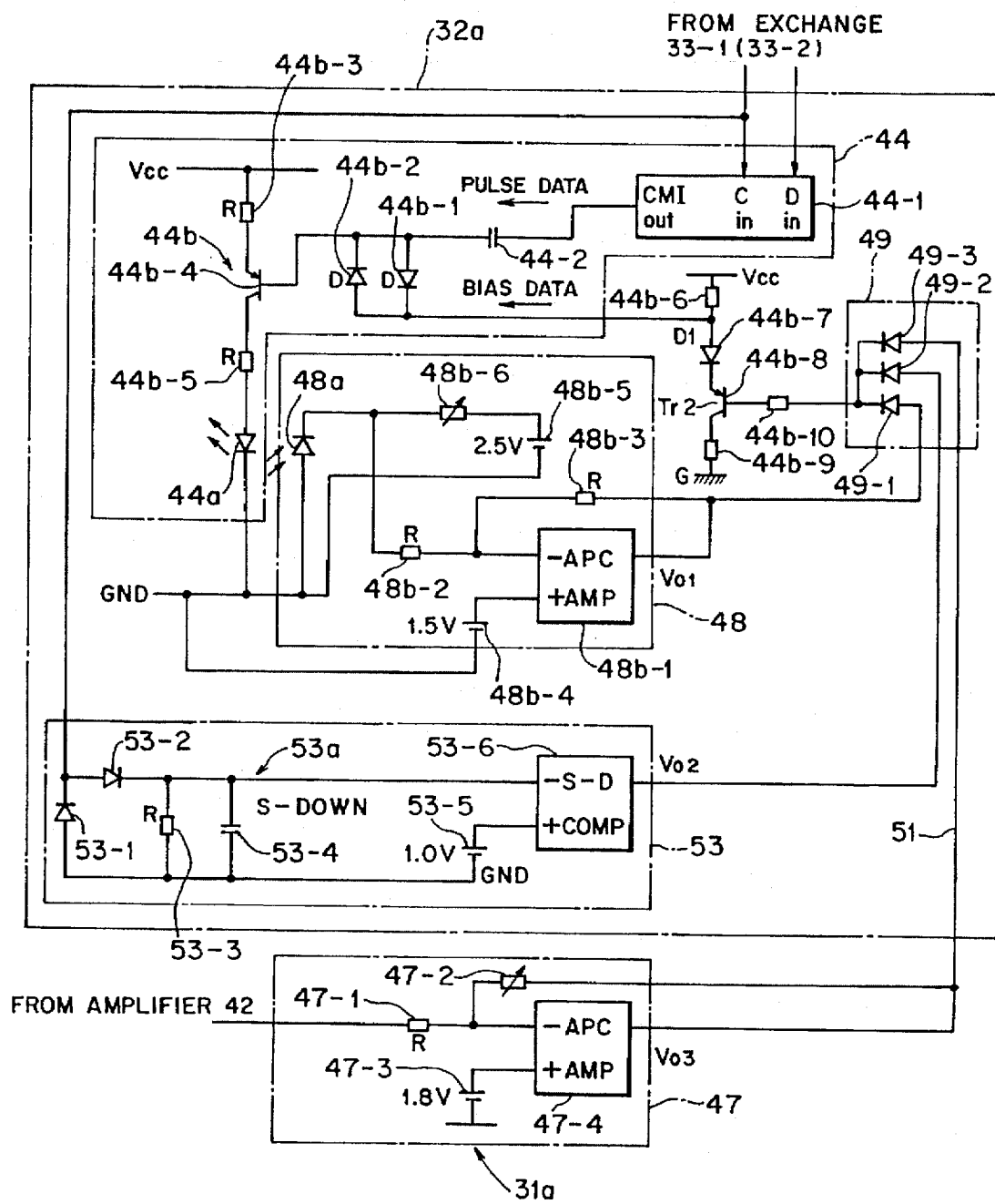
FIG. 9 is a block diagram showing a construction of essential part of a supervisory signal transmission and reception apparatus according to the first modification to the first embodiment of the present invention.

Further, the supervisory signal transmission and reception section 44, second APC circuit 48, switch circuit 49a and shut down circuit 53 of the supervisory signal transmission and reception apparatus denoted at 31a and the first APC circuit 47 of the supervisory signal transmission and reception apparatus 32a particularly have such a construction as shown in FIG. 9. It is to be noted that, in FIG. 9, like reference characters to those of FIG. 5 denoted like elements.

The shut down circuit 53 includes a pair of diodes 53-1 and 53-2 to which a clock signal is inputted from the exchange 33-1 (33-2), a resistor 53-3, a capacitor 53-4, a power supply 53-5 having an electro motive force of 1.0V, and a comparator 53-6. Particularly, the diodes 53-1 and 53-2, resistor 53-3 and capacitor 53-4 cooperatively form a clock signal disconnection detection circuit 53a for detecting disconnection of a clock signal from the exchange 33-1 (33-2).

Thus, the voltage value $V_{O\,2}$ of an output signal of the comparator 53-6 is set such that, when a clock signal is inputted regularly, it has a higher value than the voltage signals $V_{O\,1}$ and $V_{O\,3}$ from the amplifiers 48b-1 and 47-4 mentioned hereinabove, but when the clock signal is disconnected, that is, when the clock signal inputted to the diodes 53-1 and 53-2 exhibits successive data of "0", the voltage value $V_{O\,2}$ of the output voltage of the comparator 53-6 has a value lower than the voltage signals $V_{O\,1}$ and $V_{O\,3}$ from the amplifiers 48b-1 and 47-4.

The switch circuit 49a includes a diode 49-1 to which the voltage signal $V_{O\,1}$ from the APC amplifier 48b-1 is inputted and another diode 49-3 to which the voltage signal $V_{O\,3}$ from the APC amplifier 47-4 is inputted, and further includes a diode 49-2 to which the voltage signal $V_{O\,2}$ from the comparator 53-6 is inputted. The switch circuit 49a thus outputs, as a voltage signal, a lowest one of output terminal voltages of the diodes 49-1 to 49-3. Consequently, the switch circuit 49a selects a control signal with which the level of supervisory signal light to be emitted from the laser diode 44a may be lower.

Accordingly, if disconnection of the clock signal inputted to the supervisory signal transmission and reception apparatus 32a is detected, the shut down circuit 53 outputs a control signal to the LD driving circuit 44b via the switch circuit 49a to disconnect the light output from the laser diode 44a of the supervisory signal transmission and reception section 44.

In the first modification to the first embodiment of the present invention having the construction described above, when the clock signal inputted to the supervisory signal transmission and reception apparatus 32a is regular, the light signal transmission and reception apparatus operates in a similar manner as in the first embodiment described hereinabove. However, if the shut down circuit 53 detects disconnection of the clock signal inputted to the supervisory signal transmission and reception apparatus 32a, since the terminal voltage of the diode 49-2 exhibits a lowest level among those of the three diodes 49-1 to 49-3, the control signal as a voltage signal from the diode 49-2 is inputted to the LD driving circuit 44b so that the light output of the laser diode 44a is disconnected.

In other words, since the switch circuit 49a determines that one of signals from the diodes 49-1 to 49-3 which exhibits the lowest terminal voltage is effective and thus preferentially selects the signal with which the light output by the laser diode 44a is controlled to be the lowest, when the clock signal is in a steady condition, the output signal of the shut down circuit 53 is not preferentially selected, but when the clock signal is disconnected, the output signal of the shut down circuit 53 is preferentially selected to disconnect the light output.

In this manner, with the first modification to the first embodiment of the present invention, similar effects or advantages to those described hereinabove in connection with the first embodiment described above are achieved. Further, when disconnection of the clock signal is detected by the clock signal disconnection detection circuit 53a of the shut down circuit 53, a light control signal with which the light signal from the laser diode 44a is connected can be outputted to the switch circuit 49a. Consequently, the first modification is advantageous also in that, also when the clock signal is disconnected, production of dc current of the laser diode can be prevented.

b2. Second Modification to the First Embodiment

Figure 10:
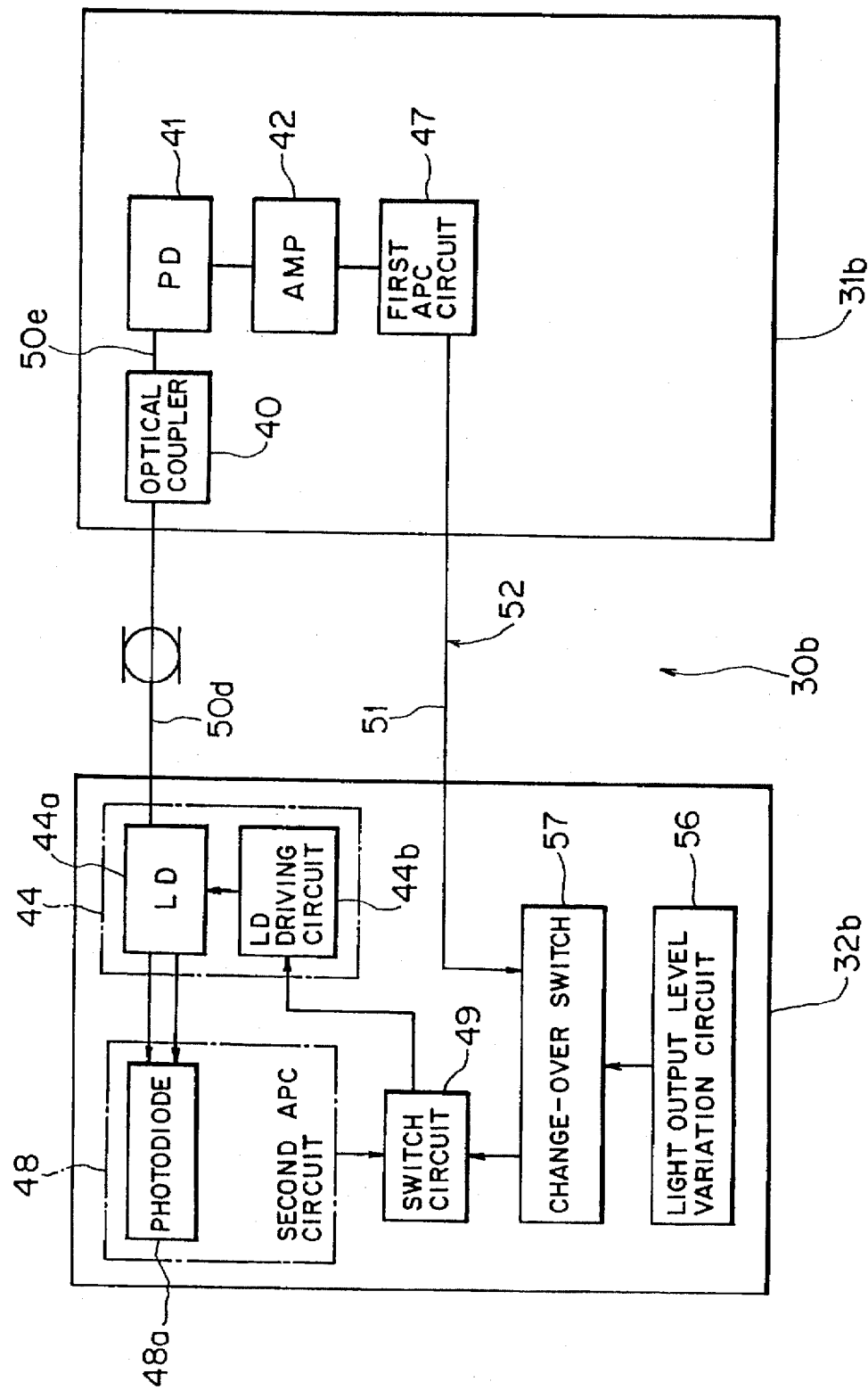
FIG. 10 is a block diagram showing the supervisory signal light control loop of a light signal transmission and reception apparatus according to a second modification to the first embodiment of the present invention.

FIG. 10 shows in block diagram a light signal transmission and reception apparatus according to a second modification to the first embodiment of the present invention, and specifically shows a construction of the supervisory signal light control loop 52. Also the light signal transmission and reception apparatus denoted at 30b shown in FIG. 10 can be applied, similarly to the first embodiment described above, to such an optical communication system as shown in FIG. 3.

In particular, the optical communication system shown in FIG. 3 can be modified such that, in place of the light signal transmission and reception apparatus 30-1 or the light signal transmission and reception apparatus 30-2, the light signal transmission and reception apparatus 30b shown in FIG. 10 is connected to the exchange 33-1 (33-2) and the two light signal transmission and reception apparatus are connected to each other by the optical fiber 34.

Referring to FIG. 10, the light signal transmission and reception apparatus 30b shown is basically similar in construction to that in the first embodiment described hereinabove except that it includes a light output level variation circuit (level variation means) 56 for variably controlling, by manual adjustment of an operator, the level of the light signal from the laser diode 44a and a change-over switch (control signal selection means) 57 for preferentially selecting the control signal from the light output level variation circuit 56 when the level of the supervisory signal light is to be controlled by the light output level variation circuit 56. It is to be noted that like reference characters in FIG. 10 to those of FIGS. 4 to 6 denote like elements.

Figure 11:
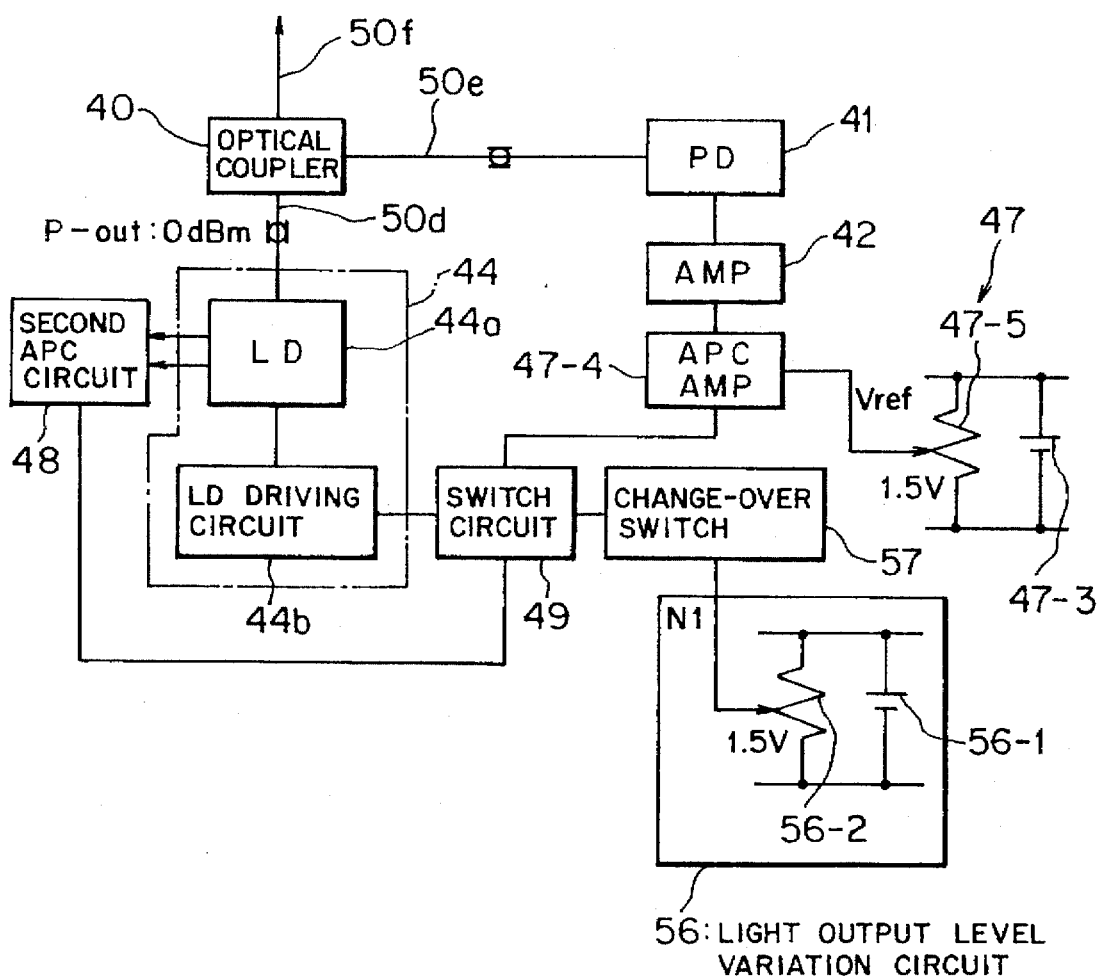
FIG. 11 is a block diagram showing a construction of essential part of the second modification to the first embodiment of the present invention.

The light output level variation circuit 56 includes, as particularly shown in FIG. 11, a power supply 56-1 and a voltage setting variable resistor 56-2. Thus, an operator can manually operate the variable resistor 56-2 to adjust the resistance value of the variable resistor 56-2 to variably control the control signal (voltage signal) to the LD driving circuit 44b for driving the laser diode 44a to control the light output level of the laser diode 44a to a desired level.

It is to be noted that, as shown in FIG. 11, a reference value voltage setting variable resistor 47-5 is connected in parallel to the power supply 47-3 of the first APC circuit 47.

In the second modification to the first embodiment of the present invention having the construction described above, in regular operation wherein variable control of the light output level of the laser diode 44a by the light output level variation circuit 56 is not performed, the light signal transmission and reception apparatus operates in a similar manner as in the first embodiment described above. However, when the level of the supervisory signal light is controlled by the light output level variation circuit 56 as in, for example, an initial condition, the change-over switch 57 disconnects the control signal from the first APC circuit 47 and preferentially selects the control signal from the light output level variation circuit 56.

Then, the operator manually adjusts the variable resistor 56-2 of the light output level variation circuit 56 to variably control the control signal (voltage signal) to be inputted to the LD driving circuit 44b so that, for example, upon initial rising of the laser diode 44a, the light output level is controlled, for example, to ±0.0 dBm as a desired level.

Thereafter, when the light output level becomes equal to ±0.0 dBM as a desired level, the voltage value of the control signal is measured (in this instance, the voltage value N1 of the control signal is N1=1.5V).

Further, the reference value voltage setting variable resistor 47-5 is controlled to make the voltage value of the reference value voltage which is inputted to the positive terminal of the APC amplifier 47-4 equal to a voltage value (N1=1.5V) when the light output level described above becomes equal to ±0.0 dBm as a desired level so that, when the first APC circuit 47 operates, the light output level of the laser diode 44a may be equal to ±0.0 dBm.

Consequently, if the control signal from the first APC circuit 47 is selected and outputted to the LD driving circuit 44b as a result of change-over control of the change-over switch 57, then while the light output level of the laser diode 44a keeps the value of ±0.0 dBm, the supervisory signal light level can be controlled to a fixed level by the first APC circuit 47.

In this manner, with the light signal transmission and reception apparatus of the second modification to the first embodiment of the present invention, similar effects or advantages to those described hereinabove in connection with the first embodiment described above are achieved. Further, since the light output level variation circuit 56 and the change-over switch 57 are provided, also when the reference value voltage when APC control by the first APC circuit 47 is to be performed is not set such as, for example, in an initial condition, a reference value voltage with which the light output level can be controlled to an optimum light output level without keeping the first APC circuit 47 inoperative, and particularly in an initial state, excessive emission of light can be suppressed. Consequently, the light signal transmission and reception apparatus of the second modification is advantageous also in that improvement in reliability and assurance of a high quality of the laser diode can be achieved.

b3. Third Modification to the First Embodiment

Figure 12:
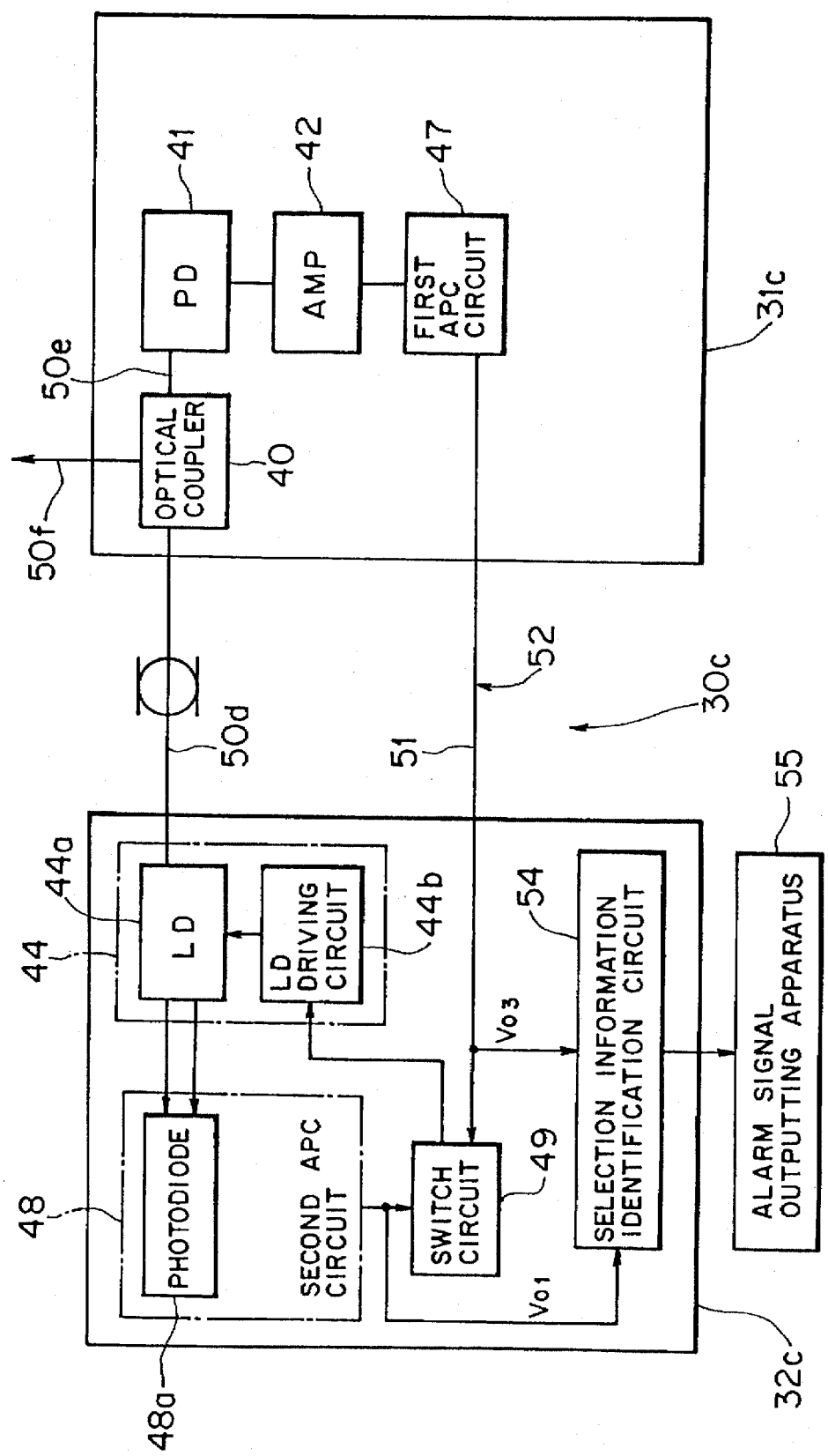
FIG. 12 is a block diagram showing the supervisory signal light control loop between light signal transmission and reception apparatus according to a third modification to the first embodiment of the present invention.

FIG. 12 shows in block diagram a light signal transmission and reception apparatus according to a third modification to the first embodiment of the present invention, and particularly shows a construction of the supervisory signal light control loop 52. Also the light signal transmission and reception apparatus denoted at 30c shown in FIG. 12 can be applied, similarly to the first embodiment described above, to such an optical communication system as shown in FIG. 3.

In particular, the optical communication system shown in FIG. 3 can be modified such that, in place of the light signal transmission and reception apparatus 30-1 or the light signal transmission and reception apparatus 30-2, the light signal transmission and reception apparatus 30c shown in FIG. 12 is connected to the exchange 33-1 (33-2) and the two light signal transmission and reception apparatus are connected to each other by the optical fiber 34.

Referring to FIG. 12, the light signal transmission and reception apparatus 30c shown is basically similar in construction to that in the first embodiment described hereinabove except that it includes a selection information identification circuit 54 and an alarm signal outputting apparatus 55. It is to be noted that like reference characters in FIG. 12 to those of FIGS. 4 to 6 denote like elements.

The selection information identification circuit (selection information identification means) 54 receives, as inputs thereto, the control signal (light control signal) $V_{O\ 3}$ from the first APC circuit 47 and the control signal $V_{O\ 1}$ from the second APC circuit 48 and identifies and recognizes a light control signal selected by the switch circuit 49 based on the voltage values of the control signals (voltage signals). In hardware, the selection information identification circuit 54 is formed, for example, from a comparator or a like element which compares magnitudes of voltage values of the control signal from the first APC circuit 47 and the control signal from the second APC circuit 48.

The alarm signal outputting apparatus 55 receives selection information from the selection information identification circuit 54 as an input thereto and discriminates, when the control signal from the second APC circuit 48 is selected by the switch circuit 49, that some trouble has occurred in the control mode by the first APC circuit 47 such as, for example, disconnection of the optical fiber 50d, and outputs an alarm signal.

In the third modification to the first embodiment of the present invention having the construction described above, when the supervisory signal light control loop 52 is in a closed loop condition, supervisory signal fixing control by the first APC circuit 47 is performed similarly as in the first embodiment described hereinabove.

However, if the supervisory signal light control loop 52 is put into an open loop condition, for example, by disconnection of the optical fiber 50d, the switch circuit 49 is changed over to now select the control signal from the second APC circuit 48. This is detected by the selection information identification circuit 54, and the alarm signal outputting apparatus 55 discriminates that some trouble has occurred in the control mode by the first APC circuit 47, and outputs an alarm signal.

In this manner, with the light signal transmission and reception apparatus of the third modification to the first embodiment of the present invention, similar effects or advantages to those described hereinabove in connection with the first embodiment described above are achieved. Further, since the light signal transmission and reception apparatus includes the selection information identification circuit 54 and the alarm signal outputting apparatus 55, an irregular condition of the control mode discriminated by the first APC circuit 47 such as, for example, disconnection of the optical fiber 50d can be discovered at an early stage. Consequently, a suitable countermeasure against the irregular condition can be taken rapidly. Accordingly, the light signal transmission and reception apparatus of the third modification is advantageous also in that improvement in reliability of the apparatus can be achieved.

b4. Fourth Modification to the First Embodiment

Figure 13:
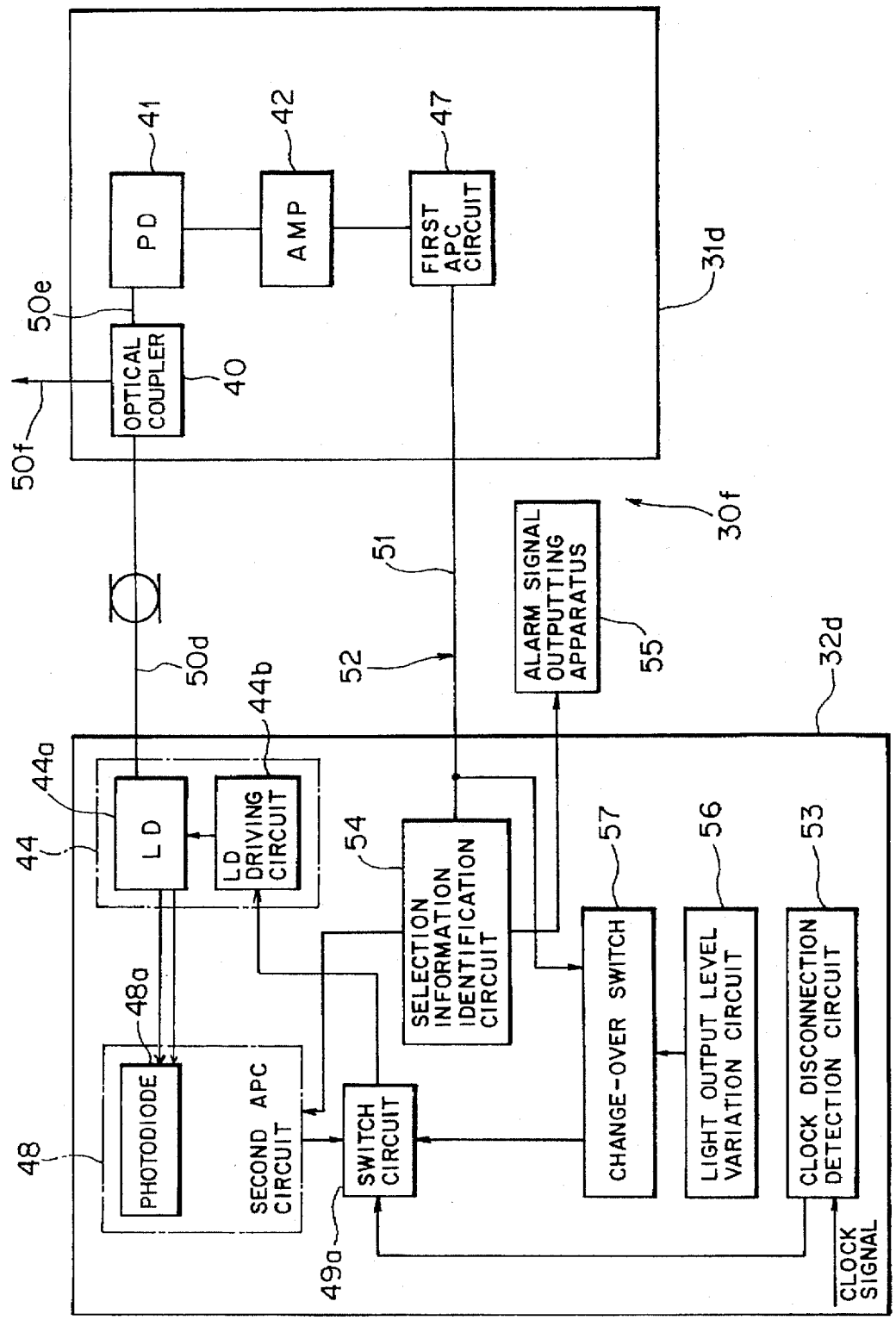
FIG. 13 is a block diagram showing the supervisory signal light control loop between light signal transmission and reception apparatus according to a fourth modification to the first embodiment of the present invention.

FIG. 13 shows in block diagram a light signal transmission and reception apparatus according to a fourth modification to the first embodiment of the present invention, and specifically shows a construction of the supervisory signal light control loop 52. Also the light signal transmission and reception apparatus denoted at 30d shown in FIG. 13 can be applied, similarly to the first embodiment described above, to such an optical communication system as shown in FIG. 3.

In particular, the optical communication system shown in FIG. 3 can be modified such that, in place of the light signal transmission and reception apparatus 30-1 or the light signal transmission and reception apparatus 30-2, the light signal transmission and reception apparatus 30d shown in FIG. 13 is connected to the exchange 33-1 (33-2) and the two light signal transmission and reception apparatus are connected to each other by the optical fiber 34.

Referring to FIG. 13, the light signal transmission and reception apparatus 30d shown is basically similar in construction to that in the first embodiment described hereinabove except that it additionally includes a shut down circuit 53 and a switch circuit 49a similar to those in the first modification (refer to FIGS. 8 and 9), a light output level variation circuit 56 and a change-over switch 57 similar to those in the second modification (refer to FIGS. 10 and 11) and a selection information identification circuit 54 and an alarm signal outputting apparatus 55 similar to those in the third modification (refer to FIG. 12). It is to be noted that like reference characters in FIG. 13 to those of FIGS. 4 to 6 denote like elements.

The light signal transmission and reception apparatus of the fourth modification to the first embodiment of the present invention having the construction described above operates, in an ordinary operation wherein supervisory signal light fixing control by the first APC circuit 47 is performed, in a similar manner as in the first embodiment described hereinabove.

Here, if the shut down circuit 53 detects that the clock signal inputted to the supervisory signal transmission and reception apparatus 32d has been disconnected, then, similarly as in the first modification described above, the diode 49-2 exhibits the lowest terminal voltage among the three diodes 49-1 to 49-3. Consequently, the control signal as a voltage signal from the diode 49-2 is inputted to the LD driving circuit 44b thereby to disconnect the light output of the laser diode 44a.

On the other hand, when the level of the supervisory signal light is controlled by the light output level variation circuit 56 in such an instance as, for example, in an initial condition, similarly as in the second embodiment described hereinabove, the change-over switch 57 disconnects the control signal from the first APC circuit 47 but preferentially selects the control signal from the light output level variation circuit 56.

Then, as the operator manually adjusts the variable resistor 56-2 of the light output level variation circuit 56 to variably control the control signal (voltage signal) to be inputted to the LD driving circuit 44b, for example, upon initial rising of the laser diode 44a or the like, the light output level is controlled, for example, to ±0.0 dBm as a desired level.

Thereafter, the voltage value of the control signal when the light output level has changed to ±0.0 dBm as a desired level is measured (in this instance, the voltage value N1 of the control signal is N1=1.5V).

Further, the reference value voltage setting variable resistor 47-5 is controlled to make the voltage value of the reference value voltage which is inputted to the positive terminal of the APC amplifier 47-4 equal to the voltage value (N1=1.5V) obtained when the light output level described above becomes equal to ±0.0 dBm as a desired level so that, when the first APC circuit 47 operates, the light output level of the laser diode 44a may be equal to ±0.0 dBm.

Consequently, if the control signal from the first APC circuit 47 is selected and outputted to the LD driving circuit 44b as a result of change-over control of the change-over switch 57, then while the light output level of the laser diode 44a keeps the value of ±0.0 dBm, the supervisory signal light level can be controlled to a fixed level by the first APC circuit 47.

Further, if the supervisory signal light control loop 52 is put into an open loop condition, for example, by disconnection of the optical fiber 50d, the switch circuit 49 is changed over to now select the control signal from the second APC circuit 48. This is detected by the selection information identification circuit 54, and the alarm signal outputting apparatus 55 discriminates that some trouble has occurred in the control mode by the first APC circuit 47, and outputs an alarm signal.

In this manner, with the light signal transmission and reception apparatus of the fourth modification to the first embodiment of the present invention, similar effects or advantages to those described hereinabove in connection with the first embodiment described above are achieved. Further, since the light signal transmission and reception apparatus includes the shut down circuit 53, light output level variation circuit 56, change-over switch 57, selection information identification circuit 54 and alarm signal outputting apparatus 55, similar effects to those of the individual modifications described above can be achieved.

b5. Others

While, in the light signal transmission and reception apparatus 30-1, 30-2 and 30a to 30d of the first embodiment and the modifications to the first embodiment described above, an object for which fixing control of the light signal level is performed is supervisory signal light, according to the present invention, the object of control is not limited to supervisory signal light but may be any other signal light if it is used for fixing control at a remote location.

Figure 6:
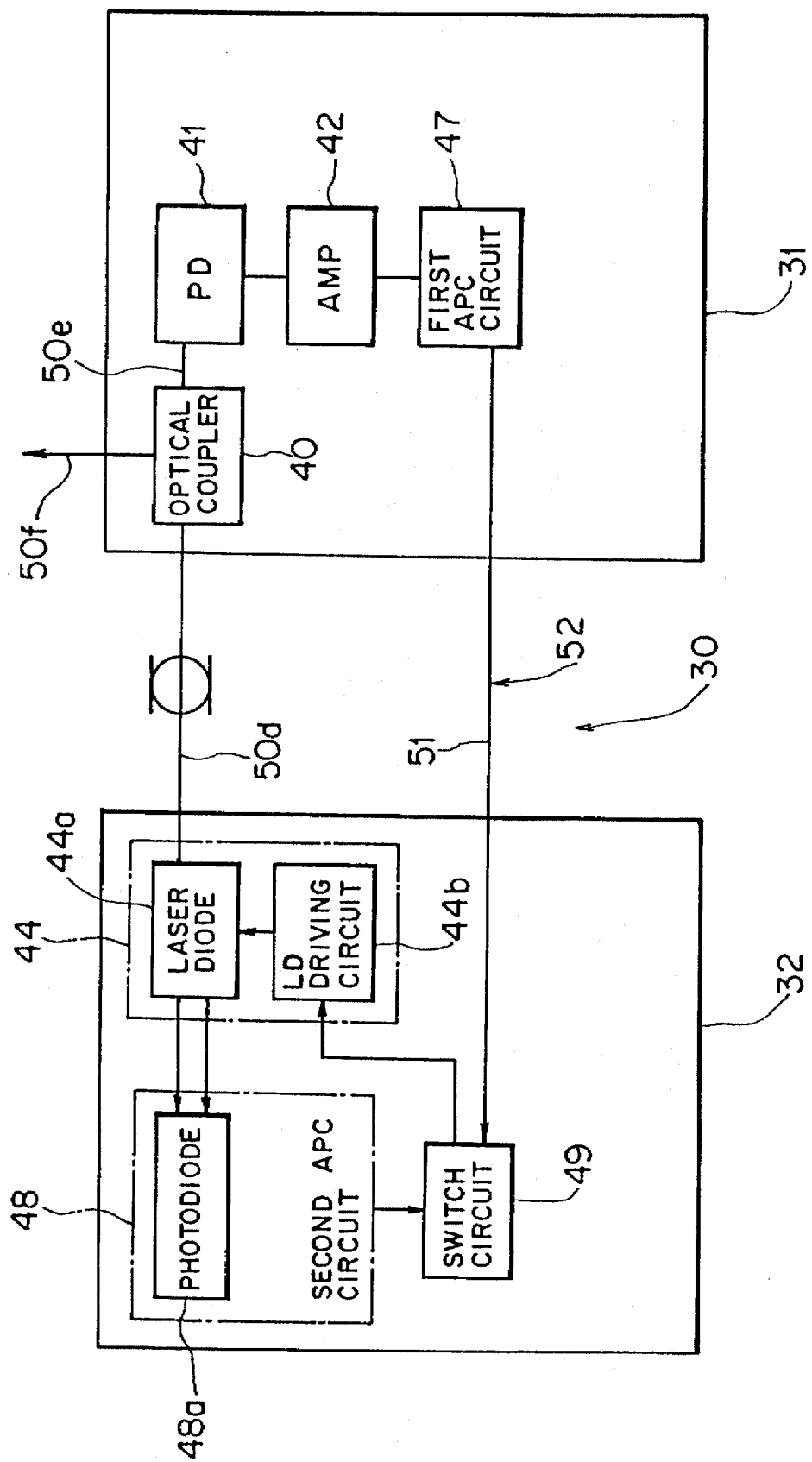
FIG. 6 is a block diagram showing a supervisory signal light control loop between light signal transmission and reception apparatus according to the first embodiment of the present invention.

In this instance, such a light signal remote control apparatus as described hereinabove with reference to FIG. 6 which includes a light transmission section 32-1 having a light supply 44a for light transmission, a light reception apparatus 32-1 located in a spaced relationship from the light transmission section 32-1 and including a first light detection section 40 or 41 for receiving a light signal from the light supply 44a of the light transmission section 32-1 via an optical fiber 50d, and a first control section 47 for outputting a light control signal for controlling the condition of the light signal from the light supply 44a in response to light detection information detected by the first light detection section 40 or 41 of the light reception apparatus 31-1, is constructed such that it further includes a first control section 47 provided in one of the light reception section 31-1 and the light transmission section 32-1, a second light detection section 48a provided in the light transmission section 32-1 for detecting a light emission condition of the light supply 44a, a second control section 48 provided in the light transmission section 32-1 for outputting a light control signal for controlling the condition of the light signal from the light supply in response to light detection information detected by the second light detection section 48a, and a switch circuit 49 provided in the light transmission section 32-1 for selectively outputting that one of the light control signal from the first control section 47 and the light control signal from the second control section 48 which makes the level of the light signal from the light supply 44a lower to the light supply 44a side.

c. Second Embodiment

Figure 14:
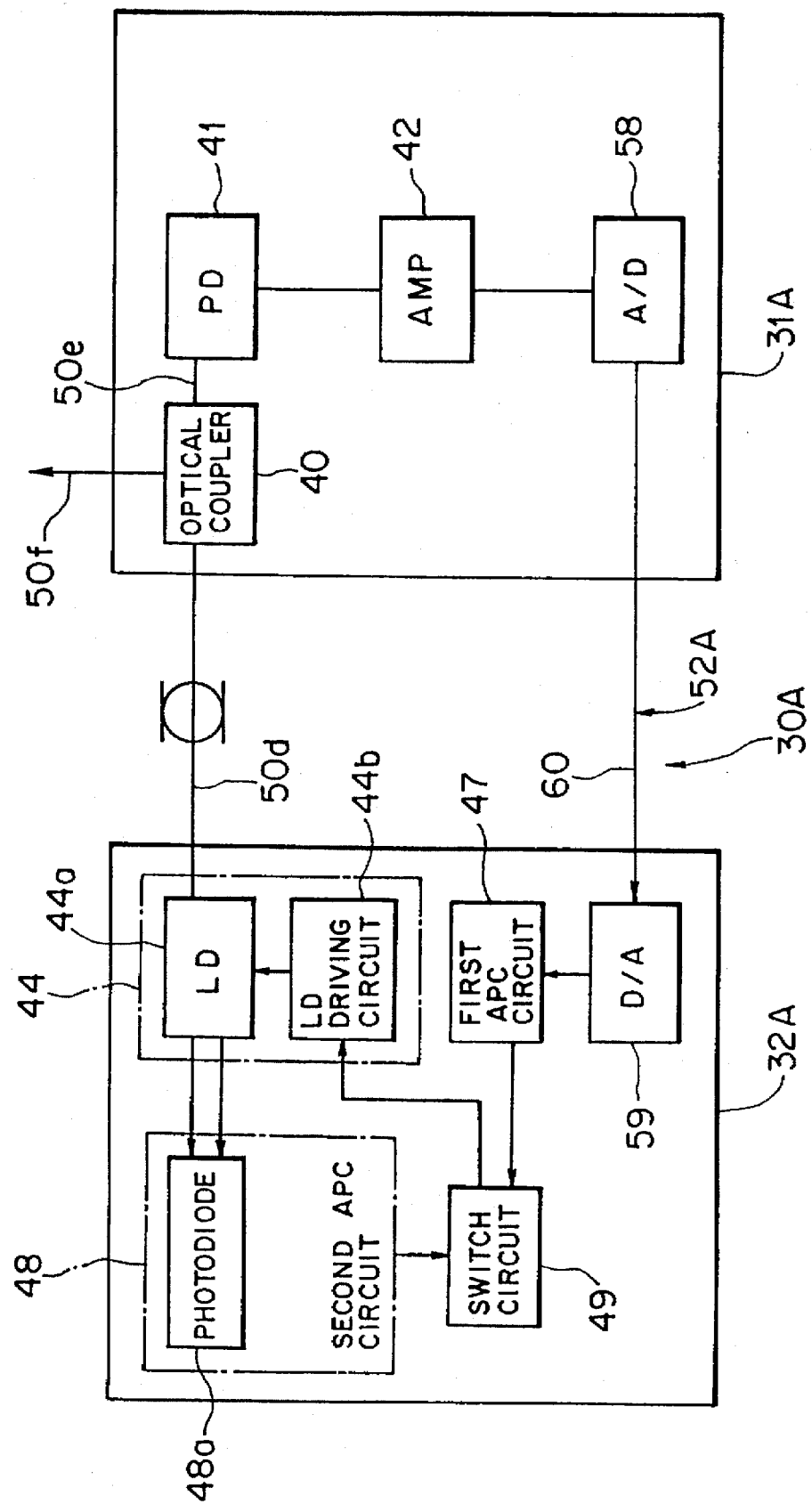
FIGS. 14 to 18 are block diagrams showing supervisory signal light control loops between light signal transmission and reception apparatus according to second to sixth embodiments of the present invention.

FIG. 14 shows in block diagram a light signal transmission and reception apparatus according to a second preferred embodiment of the present invention, and specifically shows a construction of a supervisory signal light control loop 52 of it. Also the light signal transmission and reception apparatus 30A shown in FIG. 14 can be applied, similarly to the first embodiment described hereinabove, to such an optical communication system as shown in FIG. 3.

In particular, the optical communication system shown in FIG. 3 can be modified such that, in place of the light signal transmission and reception apparatus 30-1 or the light signal transmission and reception apparatus 30-2, the light signal transmission and reception apparatus 30A shown in FIG. 14 is connected to the exchange 33-1 (33-2) and the two light signal transmission and reception apparatus are connected to each other by the optical fiber 34.

Referring to FIG. 14, the light signal transmission and reception apparatus 30A shown is basically similar in construction to that in the first embodiment described hereinabove except that the first APC circuit 47 is provided on the supervisory signal transmission and reception apparatus side denoted at 32A and an analog to digital (A/D) conversion section 58 is provided on the main signal transmission and reception apparatus side denoted at 31A while a digital to analog (D/A) conversion section 59 is provided on the supervisory signal transmission and reception apparatus 32A side, and the main signal transmission and reception apparatus 31A and supervisory signal transmission and reception apparatus 32A are interconnected by the optical fibers 50b and 50d (the optical fiber 50b is not shown in FIG. 14) and a digital electric signal line 60. It is to be noted that like reference characters in FIG. 14 to those of FIGS. 4 to 6 denote like elements.

The analog to digital conversion section 58 is provided in the main signal transmission and reception apparatus 31A side, and converts an analog electric signal as a detection signal from the photodiode 41 into a digital electric signal and outputs the digital electric signal to the supervisory signal transmission and reception apparatus 32A.

The digital to analog conversion section 59 is provided on the supervisory signal transmission and reception apparatus 32A side, and converts a digital electric signal inputted thereto from the analog to digital conversion section 58 into an analog electric signal and outputs the analog electric signal to the first APC circuit 47.

The digital electric signal line 60 interconnects the analog to digital conversion section 58 and the digital to analog conversion section 59 described above, and a digital electric signal obtained by conversion by the analog to digital conversion section 58 is inputted to the digital to analog conversion section 59 via the digital electric signal line 60. Where the digital electric signal line 60 is used, detection information can be transmitted suppressing noise components comparing with an alternative case wherein the detection information is transmitted via an analog electric signal line.

With the light signal transmission and reception apparatus 30A of the second embodiment of the present invention having the construction described above, an analog electric signal detected by the photodiode 41 and representative of the level of supervisory signal light is converted by the analog to digital conversion section 58 into a digital electric signal, which is outputted to the digital to analog conversion section 59 via the digital electric signal line 60.

The digital to analog conversion section 59 receives, as an input thereto, the detection signal as a digital electric signal via the digital electric signal line 60 from the analog to digital conversion section 58 and converts the received detection signal back into an analog electric signal, which is outputted to the first APC circuit 47.

Thereafter, similarly as in the first embodiment described hereinabove, a control signal for controlling the level of supervisory signal light is produced by the first APC circuit 47 while the level of backward light of the supervisory signal light to be produced by the laser diode 44a is detected and another control signal for controlling the level of the supervisory signal light is produced based on the thus detected level by the second APC circuit 48.

The switch circuit 49 determines that that one of the control signal from the first APC circuit 47 and the control signal from the second APC circuit 48 described above which exhibits a lower voltage, that is, that one of the control signals with which the level of the supervisory signal light after controlled becomes lower, is effective, and outputs the effective control signal to the LD driving circuit 44b.

Consequently, the laser diode 44a is controlled to emit light at a fixed level based on driving current from the LD driving circuit 44b. It is to be noted that, of the supervisory signal light emitted at the controlled fixed level, the remaining supervisory signal light separated by the optical coupler 40 is combined with a main signal from the main signal transmission section 38 by the optical coupler 39 similarly as in the first embodiment (refer to FIG. 4) described hereinabove and is transmitted to the light signal transmission and reception apparatus as a transmission designation via the optical fiber 34.

With the optical signal light transmission and reception apparatus of the second embodiment of the present invention, since it includes the analog to digital conversion section 58 and the digital to analog conversion section 59 and detection information of the level of supervisory signal light can be transmitted in the form of a digital electric signal via the digital electric signal line 60, it can be transmitted suppressing noise components thereof comparing with an alternative case wherein detection information is transmitted via an analog electric signal line, and there is no necessity of providing the first APC circuit 47 in the main signal transmission and reception apparatus 31A. Consequently, the construction of the main signal transmission and reception apparatus 31A can be simplified.

d. Third Embodiment

Figure 15:
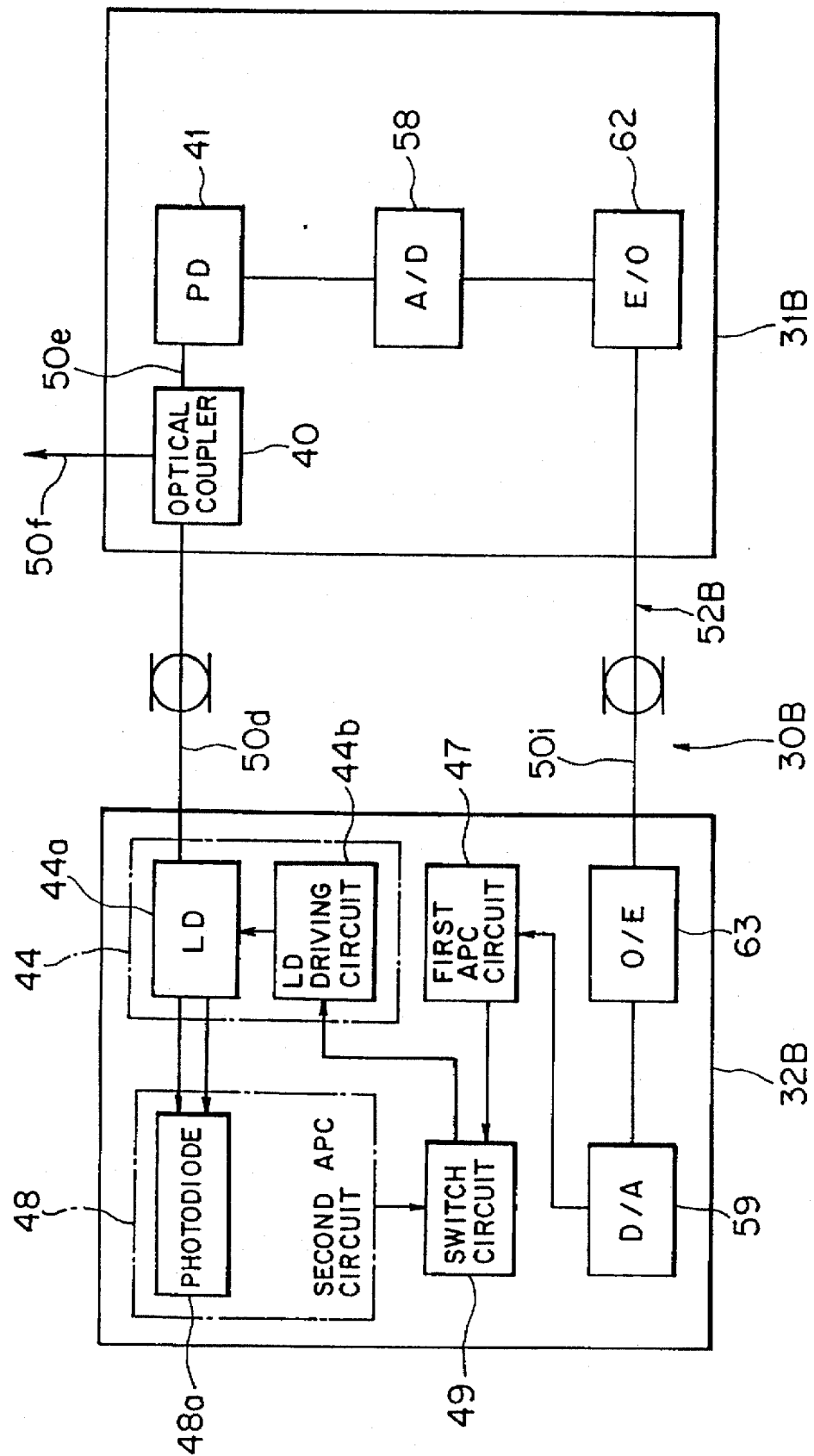

FIG. 15 shows in block diagram a light signal transmission and reception apparatus according to a third preferred embodiment of the present invention, and specifically shows a construction of a supervisory signal light control loop 52 of it. Also the light signal transmission and reception apparatus denoted at 30B shown in FIG. 15 can be applied, similarly to the first embodiment described hereinabove, to such an optical communication system as shown in FIG. 3.

In particular, the optical communication system shown in FIG. 3 can be modified such that, in place of the light signal transmission and reception apparatus 30-1 or the light signal transmission and reception apparatus 30-2, the light signal transmission and reception apparatus 30B shown in FIG. 15 is connected to the exchange 33-1 (33-2) and the two light signal transmission and reception apparatus are connected to each other by the optical fiber 34.

Referring to FIG. 15, the light signal transmission and reception apparatus 30B shown is basically similar in construction to that in the second embodiment described hereinabove except that the main signal transmission and reception apparatus denoted at 31B and the supervisory signal transmission and reception apparatus denoted at 32B are connected to each other via a detection light signal optical fiber 50i and an electric to optical (E/O) conversion section 62 is provided on the main signal transmission and reception apparatus 31B side while an optical to electrical (O/E) conversion section 63 is provided on the supervisory signal transmission and reception apparatus 32B side. It is to be noted that like reference characters in FIG. 15 to those of FIGS. 4 to 6 denote like elements.

The electric to optical (Electric/Optical) conversion section 62 has a function as a digital electric signal to light signal conversion section for converting a digital electric signal from the analog to digital conversion section 58 into a light signal and outputting the light signal to the supervisory signal transmission and reception apparatus 32B via the detection light signal optical fiber 50i. The light signal obtained by conversion by the electric to optical conversion section 62 is outputted to the supervisory signal transmission and reception apparatus 32B via the detection light signal optical fiber 50i.

Meanwhile, the optical to electrical (Optical/Electric) conversion section 63 has a function as a light signal to digital signal conversion section for converting a light signal from the electric to optical conversion section 62 into a digital electric signal. A light detection signal converted into a digital electric signal by the optical to electrical conversion section 63 is inputted to the digital to analog conversion section 59.

The optical fiber 50i connects the electric to optical conversion section 62 and the optical to electrical conversion section 63 described above to each other so that a light signal obtained by conversion by the electric to optical conversion section 62 is inputted to the optical to electrical conversion section 63 via the optical fiber 50i. It is to be noted that, where the optical fiber 50i is used, detection information can be transmitted suppressing noise components comparing with an alternative case wherein the detection information is transmitted via an analog electric signal line.

In the light signal transmission and reception apparatus 30B of the third embodiment of the present invention having the construction described above, an analog electric signal detected by the photodiode 41 and representative of the level of supervisory signal light is first converted into a digital electric signal by the analog to digital conversion section 58 and then converted into a light signal by the electric to optical conversion section 62. Consequently, the light signal is outputted to the optical to electrical conversion section 63 of the supervisory signal transmission and reception apparatus 32B side via the optical fiber 50i.

The optical to electrical conversion section 63 receives, as an input thereto, the detection signal as a light signal from the electric to optical conversion section 62 via the detection light signal optical fiber 50i, converts the light signal into a digital electric signal and outputs the digital electric signal to the digital to analog conversion section 59.

The digital to analog conversion section 59 converts, similarly as in the case of the second embodiment described hereinabove, the digital electric signal inputted thereto from the optical to electrical conversion section 63 back into an analog electric signal, which is outputted to the first APC circuit 47.

Thereafter, similarly as in the first embodiment described hereinabove, the first APC circuit 47 produces a control signal for controlling the level of supervisory signal while the second APC circuit 48 detects the level of backward light of supervisory signal light to be produced by the laser diode 44a and produces another control signal for controlling the level of the supervisory signal light in response to the thus detected level.

The switch circuit 49 determines that one of the control signal from the first APC circuit 47 and the control signal from the second APC circuit 48 described above which exhibits a lower voltage, that is, that one of the control signals with which the level of the supervisory signal light after controlled becomes lower, is effective, and outputs the effective control signal to the LD driving circuit 44b.

Consequently, the laser diode 44a is controlled to emit light at a fixed level based on driving current from the LD driving circuit 44b. It is to be noted that, of the supervisory signal light emitted at the controlled fixed level, the remaining supervisory signal light separated by the optical coupler 40 is combined with a main signal from the main signal transmission section 38 by the optical coupler 39 similarly as in the first embodiment (refer to FIG. 4) described hereinabove and is transmitted to the light signal transmission and reception apparatus as a transmission designation via the optical fiber 34.

With the optical signal light transmission and reception apparatus of the third embodiment of the present invention, since it includes the analog to digital conversion section 58 and the electric to optical conversion section 62 on the main signal transmission and reception apparatus 31B side and includes the optical to electrical conversion section 63 and the digital to analog conversion section 59 on the supervisory signal transmission and reception apparatus 32B side and detection information of the level of supervisory signal light can be transmitted in the form of a light signal via the optical fiber 50i, it can be transmitted suppressing noise components thereof comparing with an alternative case wherein detection information is transmitted via an analog electric signal line, and there is no necessity of providing the first APC circuit 47 in the main signal transmission and reception apparatus 31B. Consequently, the construction of the main signal transmission and reception apparatus 31B can be simplified.

d. Fourth Embodiment

Figure 16:
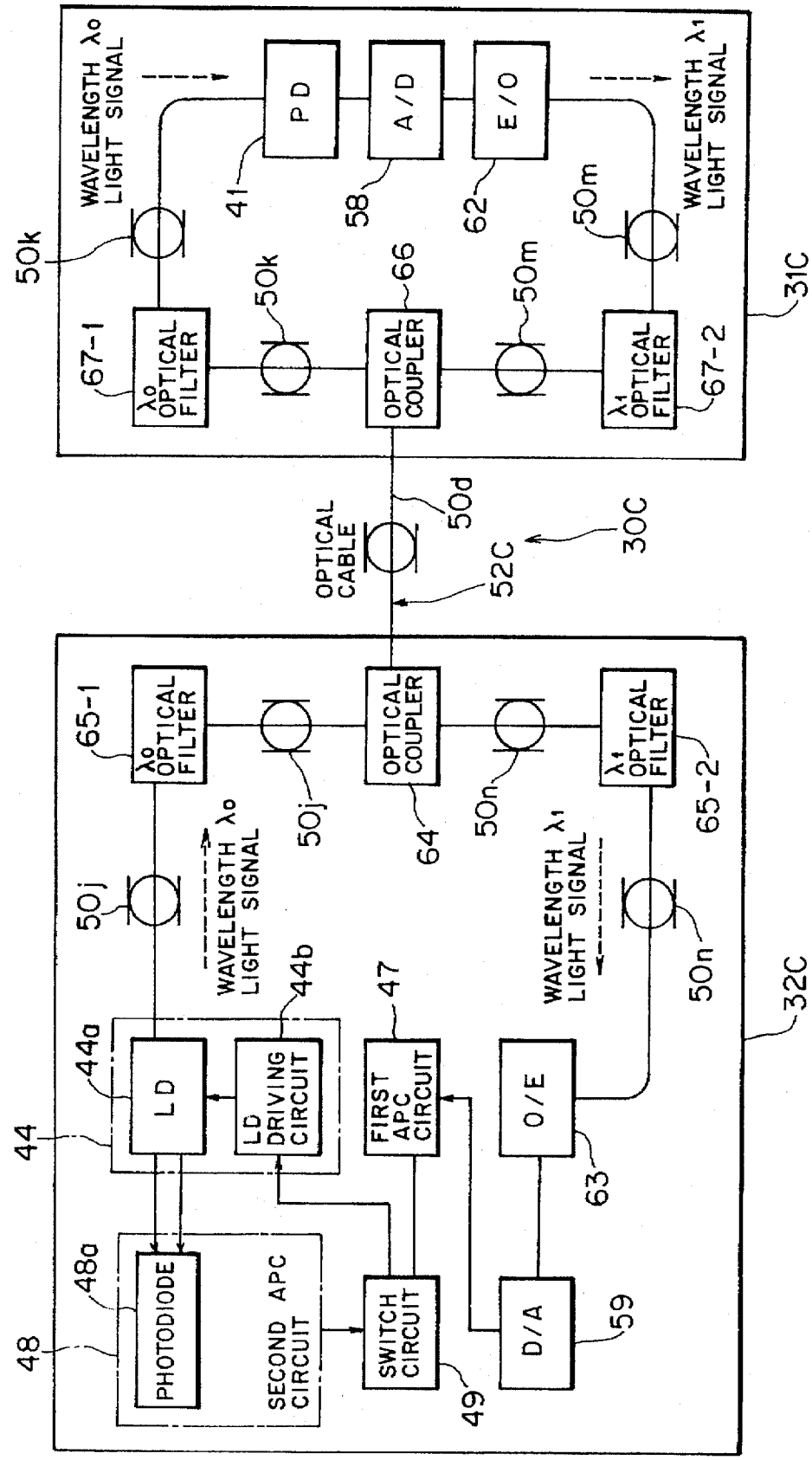

FIG. 16 shows in block diagram a light signal transmission and reception apparatus according to a fourth preferred embodiment of the present invention, and specifically shows a construction of a supervisory signal light control loop 52 of it. Also the light signal transmission and reception apparatus denoted at 30C shown in FIG. 16 can be applied, similarly to the first embodiment described hereinabove, to such an optical communication system as shown in FIG. 3.

In particular, the optical communication system shown in FIG. 3 can be modified such that, in place of the light signal transmission and reception apparatus 30-1 or the light signal transmission and reception apparatus 30-2, the light signal transmission and reception apparatus 30C shown in FIG. 15 can be connected to the exchange 33-1 (33-2) and the two light signal transmission and reception apparatus are connected to each other by the optical fiber 34.

Referring to FIG. 16, the light signal transmission and reception apparatus 30C shown is basically similar in construction to that in the third embodiment described hereinabove except that a light signal as level detection information of supervisory signal light from the photodiode 41 is transmitted not via the detection light signal optical fiber 50i for exclusive use but via the optical fiber 50d so that bidirectional transmission can be allowed by wavelength multiplexing with supervisory signal light from the laser diode 44a, or in other words, except that the optical fiber 50d is used commonly as the optical fiber for a detection light signal. It is to be noted that like reference characters in FIG. 16 to those of FIGS. 4 to 6 denote like elements.

An optical coupler 64 of the supervisory signal transmission and reception apparatus denoted at 32C is connected to the laser diode 44a via an optical fiber 50j and is connected to the optical to electrical conversion section 63 via another optical fiber 50n.

Consequently, supervisory signal light (wavelength: $\lambda_0$) outputted from the laser diode 44a via the optical fiber 50j is outputted to the main signal transmission and reception apparatus denoted at 31C via the optical fiber 50d while a light signal (wavelength: $\lambda_1$) as level detection information of supervisory signal light from the main signal transmission and reception apparatus 31C is outputted to an optical to electrical (O/E) conversion section 65-2 via the optical fiber 50n.

A $\lambda_\theta$ optical filter 65-1 which passes a light signal of the wavelength $\lambda_\theta$ is interposed in the optical fiber 50j to prevent a light signal as level detection information of supervisory signal light from the main signal transmission and reception apparatus 31C from being inputted to the laser diode 44a.

Further, a $\lambda_1$ optical to electrical conversion section 65-2 which passes a light signal of the wavelength $\lambda_1$ is interposed in the optical fiber 50n to prevent supervisory signal light from the laser diode 44a from being inputted to the optical to electrical conversion section 63 via the optical coupler 64.

An optical coupler 66 of the main signal transmission and reception apparatus 31C is connected to the photodiode 41 via an optical fiber 50k and is connected to the electric to optical conversion section 62 via another optical fiber 50m.

Consequently, supervisory signal light (wavelength: $\lambda_\theta$) separated by the optical coupler 66 is inputted to the photodiode 41 via the optical fiber 50j while a light signal (wavelength: $\lambda_1$) as level detection information of supervisory signal light inputted from the electric to optical conversion section 62 via the optical fiber 50m is outputted to the supervisory signal transmission and reception apparatus 32C via the optical fiber 50d.

A $\lambda_\theta$ optical fiber 67-1 which passes a light signal of the wavelength $\lambda_\theta$ is interposed in the optical fiber 50k to prevent a light signal as level detection information of supervisory signal light from the electric to optical conversion section 62 from being inputted to the photodiode 41 via the optical coupler 66.

Further, a $\lambda_1$ optical fiber 67-2 which passes a light signal of the wavelength $\lambda_1$ is interposed in the optical fiber 50m to prevent supervisory signal light from the laser diode 44a from being inputted to the electric to optical conversion section 62.

It is to be noted that the photodiode 41, analog to digital conversion section 58 and electric to optical conversion section 62 of the main signal transmission and reception apparatus 31C and the supervisory signal transmission and reception section 44, first APC circuit 47, second APC circuit 48, switch circuit 49, optical to electrical conversion section 63 and digital to analog conversion section 59 of the supervisory signal transmission and reception apparatus 32C have similar constructions to those in the third embodiment described hereinabove.

The optical coupler 64 and the optical coupler 66 are connected to each other via the optical fiber 50d so that supervisory signal light (wavelength: $\lambda_\theta$) from the laser diode 44a and a light signal (wavelength: $\lambda_1$) as level detection information of supervisory signal light from the electric to optical conversion section 62 are wavelength multiplexed and transmitted by the optical fiber 50d.

In the light signal transmission and reception apparatus 30C of the fourth embodiment of the present invention having the construction described above, supervisory signal light outputted from the laser diode 44a of the supervisory signal transmission and reception apparatus 32C is inputted to the optical coupler 66 of the main signal transmission and reception apparatus 31C via the optical fiber 50j, $\lambda_\theta$ optical filter 65-1, optical coupler 64 and optical fiber 50d.

The supervisory signal light inputted to the optical coupler 66 passes the optical fiber 50k and the $\lambda_\theta$ optical fiber 67-1 and is inputted to the photodiode 41, by which the level thereof is detected as an analog electric signal.

Then, a detection signal from the photodiode 41 is converted into a digital electric signal by the analog to digital conversion section 58 and then converted back into a light signal by the electric to optical conversion section 62. Thereafter, the light signal from the electric to optical conversion section 62 is inputted to the optical coupler 64 of the supervisory signal transmission and reception apparatus 32C via the optical fiber 50m, $\lambda_1$ optical fiber 67-2, optical coupler 66 and optical fiber 50d.

The detection signal inputted to the optical coupler 64 passes the optical fiber 50n and the $\lambda_1$ optical to electrical conversion section 65-2 and is inputted to the optical to electrical conversion section 63, by which the light signal as the detection signal is converted into a digital electric signal. The digital electric signal is outputted to the digital to analog conversion section 59.

The digital to analog conversion section 59 converts the digital electric signal inputted thereto from the optical to electrical conversion section 63 back into an analog electric signal similarly as in the second embodiment described hereinabove. The analog electric signal is outputted to the first APC circuit 47.

Thereafter, similarly as in the first embodiment described hereinabove, the first APC circuit 47 produces a control signal for controlling the level of supervisory signal light while the second APC circuit 48 detects the level of backward light of the supervisory signal light to be produced by the laser diode 44a and produces a control signal for controlling the level of the supervisory signal light in response to the thus detected level.

The switch circuit 49 determines that one of the control signal from the first APC circuit 47 and the control signal from the second APC circuit 48 described above which exhibits a lower voltage, that is, that one of the control signals with which the level of the supervisory signal light after controlled becomes lower, is effective, and outputs the effective control signal to the LD driving circuit 44b.

Consequently, the laser diode 44a is controlled to emit light at a fixed level based on driving current from the LD driving circuit 44b. It is to be noted that, of the supervisory signal light emitted at the controlled fixed level, the remaining supervisory signal light separated by the optical coupler 40 is combined with a main signal from the main signal transmission section 38 by the optical coupler 39 similarly as in the first embodiment (refer to FIG. 4) described hereinabove and is transmitted to the light signal transmission and reception apparatus as a transmission designation via the optical fiber 34.

With the optical signal light transmission and reception apparatus of the fourth embodiment of the present invention, since supervisory signal light (wavelength: $\lambda_\theta$) from the laser diode 44a and a light signal (wavelength: $\lambda_1$) as level detection information of supervisory signal light from the electric to optical conversion section 62 can be wavelength multiplexed and transmitted by the optical fiber 50d, the number of terminals required to connect the supervisory signal transmission and reception apparatus 32C and the main signal transmission and reception apparatus 31C to each other can be reduced, resulting in an advantage in that connection of the apparatus is facilitated. Further, detection information of the level of supervisory signal light can be transmitted suppressing noise components thereof comparing with an alternative case wherein such detection information is transmitted via an analog electric signal line, and there is no necessity of providing the first APC circuit 47 in the main signal transmission and reception apparatus 31C. Consequently, the construction of the main signal transmission and reception apparatus 31C can be simplified.

f. Fifth Embodiment

Figure 17:
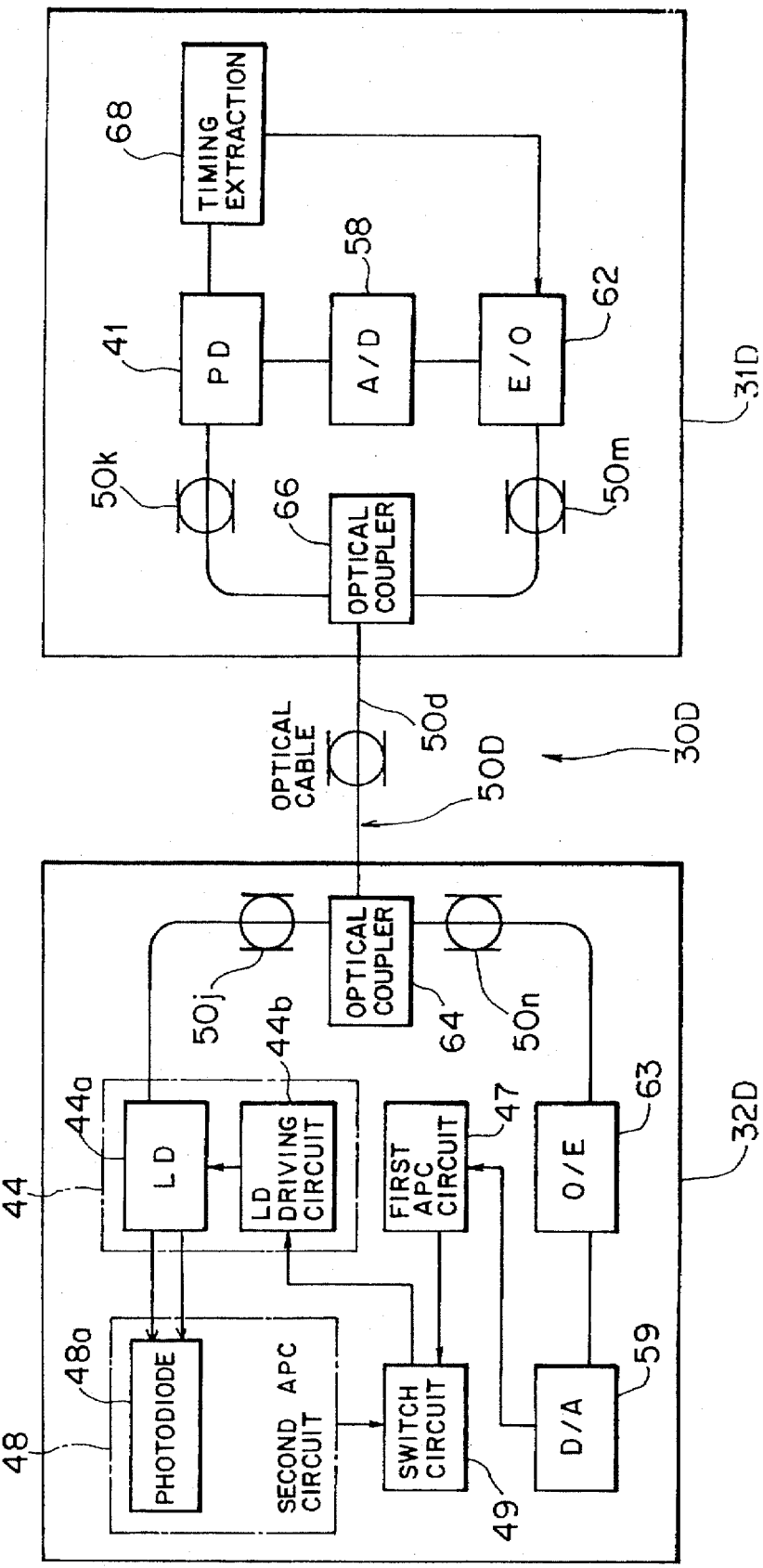

FIG. 17 shows in block diagram a light signal transmission and reception apparatus according to a fifth preferred embodiment of the present invention, and specifically shows a construction of a supervisory signal light control loop 52 of it. Also the light signal transmission and reception apparatus denoted at 30D shown in FIG. 17 can be applied, similarly to the first embodiment described hereinabove, to such an optical communication system as shown in FIG. 3.

In particular, the optical communication system shown in FIG. 3 can be modified such that, in place of the light signal transmission and reception apparatus 30-1 or the light signal transmission and reception apparatus 30-2, the light signal transmission and reception apparatus 30D shown in FIG. 17 is connected to the exchange 33-1 (33-2) and the two light signal transmission and reception apparatus are connected to each other by the optical fiber 34.

Referring to FIG. 17, the light signal transmission and reception apparatus 30D shown is basically similar in construction to that in the fourth embodiment described hereinabove except that the main signal transmission and reception apparatus denoted at 31D includes a frame timing extraction section 68 and a light signal as level detection information of supervisory signal light from the photodiode 41 is bidirectionally transmitted by time division multiplexing with supervisory signal light from the laser diode 44a such that the optical fiber 50d is used commonly as an optical fiber for a detection light signal. It is to be noted that like reference characters in FIG. 17 to those of FIG. 16 denote like elements.

The optical coupler 64 of the supervisory signal transmission and reception apparatus 32D is connected to the laser diode 44a via the optical fiber 50j and is connected to the optical to electrical conversion section 63 via the optical fiber 50n.

Consequently, supervisory signal light (wavelength: $\lambda_\theta$) outputted from the laser diode 44a via the optical fiber 50j is outputted to the main signal transmission and reception apparatus 31D via the optical fiber 50d while a light signal (wavelength: $\lambda_1$) as level detection information of the supervisory signal light from the main signal transmission and reception apparatus 31D is outputted to the optical to electrical conversion section 65-2 via the optical fiber 50n.

The optical coupler 66 of the main signal transmission and reception apparatus 31D is connected to the photodiode 41 via the optical fiber 50k and is connected to the electric to optical conversion section 62 via the optical fiber 50m.

Consequently, the supervisory signal light (wavelength: $\lambda_\theta$) separated by the optical coupler 66 is inputted to the photodiode 41 via the optical fiber 50j while a light signal (wavelength: $\lambda_1$) as level detection information of the supervisory signal light inputted from the electric to optical conversion section 62 via the optical fiber 50m can be outputted to the supervisory signal transmission and reception apparatus 32D via the optical fiber 50d.

It is to be noted that the photodiode 41, analog to digital conversion section 58 and electric to optical conversion section 62 of the main signal transmission and reception apparatus 31D and the supervisory signal transmission and reception section 44, first APC circuit 47, second APC circuit 48, switch circuit 49, optical to electrical conversion section 63 and digital to analog conversion section 59 of the supervisory signal transmission and reception apparatus 32D have similar constructions to those in the third embodiment described hereinabove.

The optical coupler 64 and the optical coupler 66 are connected to each other by the optical fiber 50d so that supervisory signal light (wavelength: $\lambda_\theta$) from the laser diode 44a and a light signal (wavelength: $\lambda_1$) as level detection information of supervisory signal light from the electric to optical conversion section 62 are wavelength multiplexed and transmitted by the optical fiber 50d.

The frame timing extraction section 68 extracts a frame component included in level detection information of a supervisory signal from the photodiode 41 and produces, based on the thus extracted frame component, a timing signal at which a light signal as level detection information of supervisory signal light is to be sent out from the electric to optical conversion section 62. Consequently, a light signal as level detection information of supervisory signal light can be time division multiplexed with and transmitted together with supervisory signal light from the laser diode 44a by the optical fiber 50d.

In the light signal transmission and reception apparatus 30D of the fifth embodiment of the present invention having the construction described above, supervisory signal light outputted from the laser diode 44a of the supervisory signal transmission and reception apparatus 32D is inputted to the optical coupler 66 of the main signal transmission and reception apparatus 31D via the optical fiber 50j, optical coupler 64 and optical fiber 50d.

The supervisory signal light inputted to the optical coupler 66 is inputted via the optical fiber 50k to the photodiode 41, by which the level of the supervisory signal light is detected as an analog electric signal. A detection signal from the photodiode 41 is converted into a digital electric signal by the analog to digital conversion section 58 and then converted into a light signal by the electric to optical conversion section 62.

On the other hand, the frame timing extraction section 68 extracts a frame component included in the level detection information of the supervisory signal light from the photodiode 41 and produces, based on the thus extracted frame component, a timing signal at which a light signal as level detection information of the supervisory signal light is to be sent out from the electric to optical conversion section 62.

The detection signal converted into a light signal by the electric to optical conversion section 62 is inputted to the optical coupler 64 of the supervisory signal transmission and reception apparatus 32D via the optical fiber 50m, $\lambda_1$ optical fiber 67-2, optical coupler 66 and optical fiber 50d in response to the timing signal produced by the frame timing extraction section 68.

Thereafter, the detection signal in the form of a light signal is inputted via the optical fiber 50n to the optical to electrical conversion section 63, by which the light signal as the detection signal is converted into a digital electric signal. The digital electric signal is outputted to the digital to analog conversion section 59. The digital to analog conversion section 59 converts the digital electric signal inputted thereto from the optical to electrical conversion section 63 back into an analog electric signal similarly as in the second embodiment described hereinabove, and outputs the analog electric signal to the first APC circuit 47.

Further, similarly as in the first embodiment described hereinabove, the first APC circuit 47 produces a control signal for controlling the level of supervisory signal light while the second APC circuit 48 detects the level of backward light of supervisory signal light produced by the laser diode 44a and produces a control signal for controlling the level of the supervisory signal light in response to the thus detected level.

The switch circuit 49 determines that one of the control signal from the first APC circuit 47 and the control signal from the second APC circuit 48 described above which exhibits a lower voltage, that is, that one of the control signals with which the level of the supervisory signal light after controlled becomes lower, is effective, and outputs the effective control signal to the LD driving circuit 44b.

Consequently, the laser diode 44a is controlled to emit light at a fixed level based on driving current from the LD driving circuit 44b. It is to be noted that, of the supervisory signal light emitted at the controlled fixed level, the remaining supervisory signal light separated by the optical coupler 40 is combined with a main signal from the main signal transmission section 38 by the optical coupler 39 similarly as in the first embodiment (refer to FIG. 4) described hereinabove and is transmitted to the light signal transmission and reception apparatus as a transmission designation via the optical fiber 34.

With the optical signal light transmission and reception apparatus of the fifth embodiment of the present invention, since a timing signal is produced by the frame timing extraction section 68 and supervisory signal light from the laser diode 44a and a light signal as level detection information of the supervisory signal light from the electric to optical conversion section 62 are time division multiplexed and transmitted by the optical fiber 50d, the number of terminals required to connect the supervisory signal transmission and reception apparatus 32D and the main signal transmission and reception apparatus 31D to each other can be reduced, resulting in an advantage in that connection of the apparatus is facilitated. Further, detection information of the level of supervisory signal light can be transmitted suppressing noise components thereof comparing with an alternative case wherein such detection information is transmitted via an analog electric signal line, and there is no necessity of providing the first APC circuit 47 in the main signal transmission and reception apparatus 31D. Consequently, the construction of the main signal transmission and reception apparatus 31D can be simplified.

g. Sixth Embodiment

Figure 18:
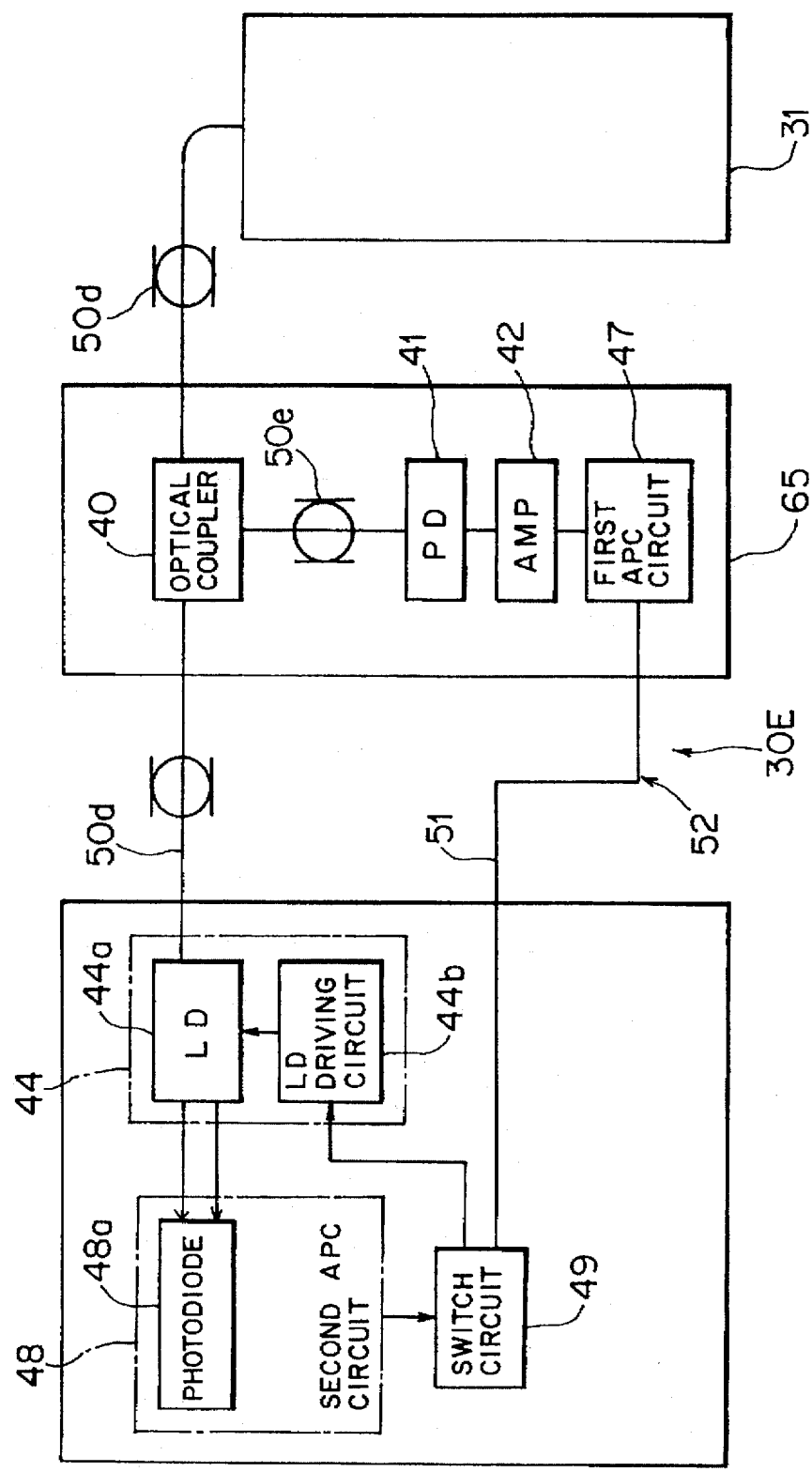
Figure 19:
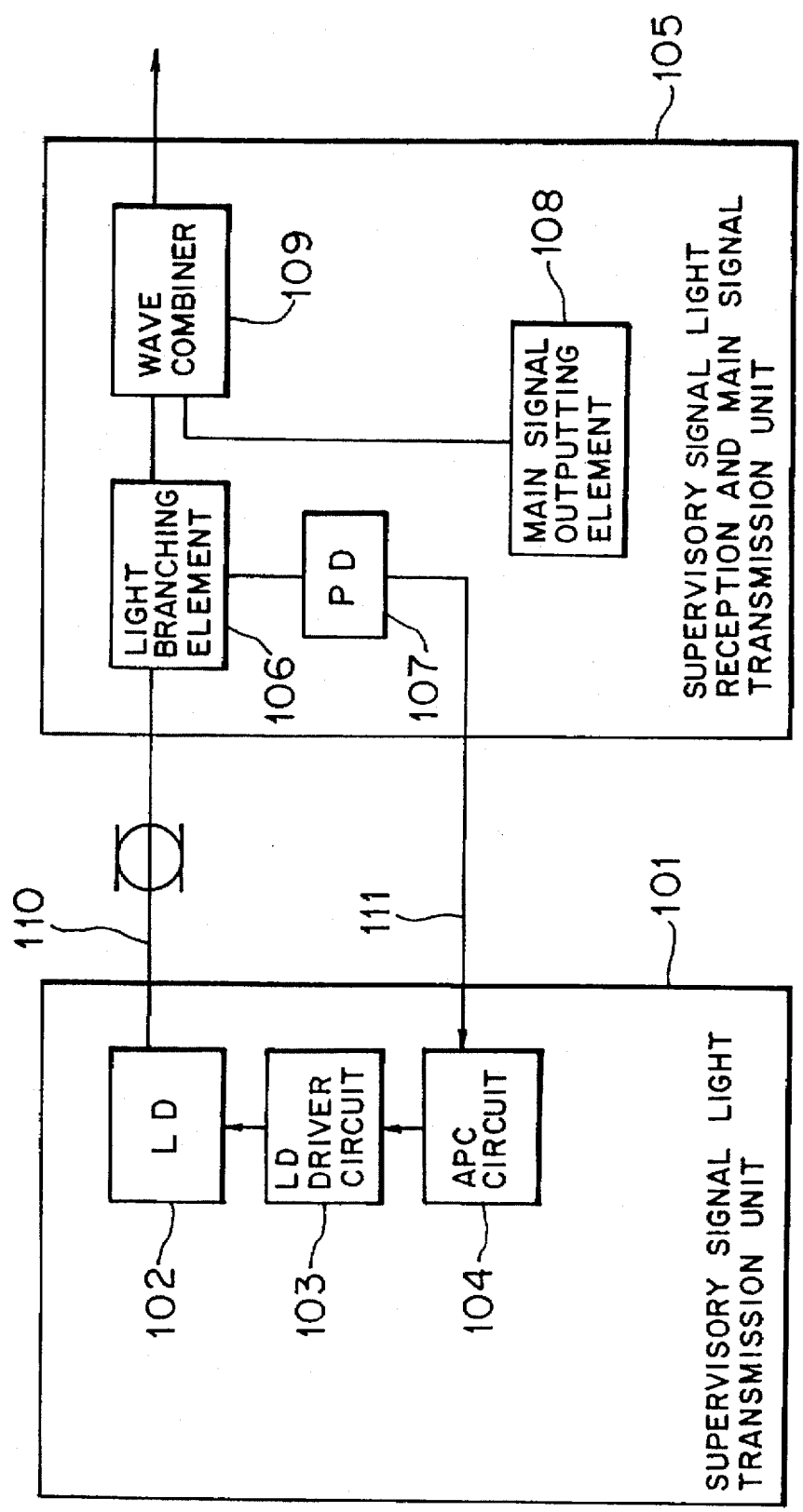
FIG. 19 is a block diagram showing an APC loop of a light signal transmission apparatus to which a light signal remote control apparatus is applied.

FIG. 18 shows in block diagram a light signal transmission and reception apparatus according to a sixth preferred embodiment of the present invention, and specifically shows a construction of a supervisory signal light control loop 52 of it. Also the light signal transmission and reception apparatus denoted at 30E shown in FIG. 18 can be applied, similarly to the first embodiment described hereinabove, to such an optical communication system as shown in FIG. 3.

In particular, the optical communication system shown in FIG. 3 can be modified such that, in place of the light signal transmission and reception apparatus 30-1 or the light signal transmission and reception apparatus 30-2, the light signal transmission and reception apparatus 30E shown in FIG. 18 can be connected to the exchange 33-1 (33-2) and the two light signal transmission and reception apparatus can be connected to each other by the optical fiber 34.

Referring to FIG. 18, the light signal transmission and reception apparatus 30E shown is basically similar in construction to that in the first embodiment described hereinabove except that the optical coupler 40, the photodiode 41, the amplifier 42, the first APC circuit 47 and the optical fiber 50e which interconnects the optical coupler 40 and the photodiode 41 are provided on a separate body (light reception section) 65 of the main signal transmission and reception apparatus denoted at 31 while the supervisory signal transmission and reception apparatus (light transmission section) denoted at 32 is basically similar to that described hereinabove in connection with the first embodiment. It is to be noted that like reference characters in FIG. 18 to those of FIGS. 4 to 6 denote like elements.

The separate body 65 is interposed on the optical fiber 50d which connects the main signal transmission and reception apparatus 31 and the supervisory signal transmission and reception apparatus 32 to each other. The optical coupler 40, the photodiode 41, the amplifier 42, the first APC circuit 47 and the optical fiber 50e for interconnecting the optical coupler 40 and the photodiode 41, which construct the separate body 65, are similar to those in the first embodiment described hereinabove.

It is to be noted that, similarly as in the first embodiment described hereinabove, the supervisory signal transmission and reception section 44, optical coupler 40, photodiode 41, amplifier 42, first APC circuit 47, switch circuit 49 and second APC circuit 48 cooperatively form a supervisory signal light control loop 52 for controlling the level of supervisory signal light transmitted from the supervisory signal transmission and reception section 44.

In the light signal transmission and reception apparatus of the sixth embodiment of the present invention having the construction described above, the main signal transmission and reception apparatus 31 combines a supervisory signal from the supervisory signal transmission and reception apparatus 32 and a main signal and transmits a resulting signal to the light signal transmission and reception apparatus as a transmission destination via the optical fiber 34. Here, the level of the supervisory signal from the supervisory signal transmission and reception apparatus 32 can be controlled to a fixed level similarly as in the first embodiment described hereinabove by means of the supervisory signal light control loop 52 formed by and between the supervisory signal transmission and reception apparatus 32 and the separate body 65.

In this manner, with the light signal transmission and reception apparatus of the sixth embodiment of the present invention, since the optical coupler 40, the photodiode 41, the amplifier 42, the first APC circuit 47 and the optical fiber 50e which interconnects the optical coupler 40 and the photodiode 41 are provided in the separate body 65 of the main signal transmission and reception apparatus 31, similar advantages to those of the first embodiment described hereinabove are achieved, and besides, the construction of the main signal transmission and reception apparatus 31 can be simplified.

h. Others

It is to be noted that the various forms described in connection with the modifications to the first embodiment can be applied to any of the light signal transmission and reception apparatus 30A to 30E of the second to sixth embodiments described above. Also in this instance, similar advantages to those provided by the second to sixth embodiments described above can be achieved and similar advantages to those of the modifications to the first embodiment described hereinabove can be achieved.

Further, while, also in the light signal transmission and reception apparatus 30A to 30E of the second to sixth embodiments described above, an object for which fixing control of the light signal level is performed is supervisory signal light, according to the present invention, the object of control is not limited to supervisory signal light but may be any other signal light if it is used for fixing control over a long distance.

Having now fully described the invention, it will be apparent to one of ordinary skill in the art that many changes and modifications can be made thereto without departing from the spirit and scope of the invention as set forth herein.

What is claimed is:

1. A light signal remote control apparatus, comprising:
    a light transmission section including a light source for emitting light to be transmitted;
    a light reception section located in a spaced relationship from said light transmission section and including a first light detection section for receiving the light signal from said light source of said light transmission section via an optical fiber;
    a first control section for outputting a light control signal for controlling the state of the light signal from said light source in response to light detection information detected by said first light detection section of said light reception section;
    said first control section being provided in one of said light transmission section and said light reception section;
    a second light detection section provided in said light transmission section for detecting a light emitting state of said light source;
    a second control section provided in said light transmission section for outputting a light control signal for controlling the state of the light signal from said light source in response to light detection information detected by said second light detection section; and
    a switch section provided in said light transmission section for selectively outputting to said light source one of the light control signal from said first control section and the light control signal from said second control section with which the light signal from said light source is controlled lower than that with the other.

2. A light signal remote control apparatus as claimed in claim 1, wherein said first control section is provided in said light reception section, and said light transmission section and said light reception section are interconnected by a control line such that the light control signal from said first control section is inputted to said switch section via said control line.

3. A light signal remote control apparatus as claimed in claim 1, wherein said first light detection section includes a photodiode for detecting the received light signal as an analog electric signal, and said light reception section includes an analog to digital conversion section for converting the analog electric signal as a detection signal from said first light detection section into a digital electric signal and outputting the digital electric signal to said light transmission section while said light transmission section includes a digital to analog conversion section for converting the digital electric signal inputted thereto from said analog to digital conversion section into an analog electric signal, which is inputted to said first control section provided in said light transmission section.

4. A light signal remote control apparatus as claimed in claim 1, wherein said first light detection section includes a photodiode for detecting the received light signal as an analog electric signal, and said light reception section includes an analog to digital conversion section for converting the analog electric signal as a detection signal from said first light detection section into a digital electric signal and a digital electric signal to light signal conversion section for converting the digital electric signal from said analog to digital conversion section into a light signal and outputting the light signal to said light transmission section via an optical fiber for a detection light signal while said light transmission section includes a light signal to digital electric signal conversion section for converting the light signal from said digital electric signal to light signal conversion section into a digital signal and a digital to analog conversion section for converting the digital electric signal inputted thereto from said light signal to digital electric signal conversion section into an analog electric signal, which is inputted to said first control section provided in said light transmission section.

5. A light signal remote control apparatus as claimed in claim 4, wherein said optical fiber for a detection light signal is common to said optical fiber.

6. A light signal remote control apparatus as claimed in claim 1, further comprising a clock signal disconnection detection circuit for detecting disconnection of a clock signal inputted to said light transmission section, said clock signal disconnection detection circuit outputting, when disconnection of the clock signal is detected, to said switch section a light control signal for disconnecting the light signal from said light source.

7. A light signal remote control apparatus as claimed in claim 2, further comprising a clock signal disconnection detection circuit for detecting disconnection of a clock signal inputted to said light transmission section, said clock signal disconnection detection circuit outputting, when disconnection of the clock signal is detected, to said switch section a light control signal for disconnecting the light signal from said light source.

8. A light signal remote control apparatus as claimed in claim 3, further comprising a clock signal disconnection detection circuit for detecting disconnection of a clock signal inputted to said light transmission section, said clock signal disconnection detection circuit outputting, when disconnection of the clock signal is detected, to said switch section a light control signal for disconnecting the light signal from said light source.

9. A light signal remote control apparatus as claimed in claim 4, further comprising a clock signal disconnection detection circuit for detecting disconnection of a clock signal inputted to said light transmission section, said clock signal disconnection detection circuit outputting, when disconnection of the clock signal is detected, to said switch section a light control signal for disconnecting the light signal from said light source.

10. A light signal remote control apparatus as claimed in claim 5, further comprising a clock signal disconnection detection circuit for detecting disconnection of a clock signal inputted to said light transmission section, said clock signal disconnection detection circuit outputting, when disconnection of the clock signal is detected, to said switch section a light control signal for disconnecting the light signal from said light source.

11. A light signal remote control apparatus as claimed in claim 1, wherein said light transmission section includes level variation means for variably controlling the level of the light signal from said light source, and control signal selection means for controlling so that, when the level of the light signal from said light source is to be controlled, a control signal from said level variation means is selected preferentially.

12. A light signal remote control apparatus as claimed in claim 2, wherein said light transmission section includes level variation means for variably controlling the level of the light signal from said light source, and control signal selection means for controlling so that, when the level of the light signal from said light source is to be controlled, a control signal from said level variation means is selected preferentially.

13. A light signal remote control apparatus as claimed in claim 3, wherein said light transmission section includes level variation means for variably controlling the level of the light signal from said light source, and control signal selection means for controlling so that, when the level of the light signal from said light source is to be controlled, a control signal from said level variation means is selected preferentially.

14. A light signal remote control apparatus as claimed in claim 4, wherein said light transmission section includes level variation means for variably controlling the level of the light signal from said light source, and control signal selection means for controlling so that, when the level of the light signal from said light source is to be controlled, a control signal from said level variation means is selected preferentially.

15. A light signal remote control apparatus as claimed in claim 5, wherein said light transmission section includes level variation means for variably controlling the level of the light signal from said light source, and control signal selection means for controlling so that, when the level of the light signal from said light source is to be controlled, a control signal from said level variation means is selected preferentially.

16. A light signal remote control apparatus as claimed in claim 6, wherein said light transmission section includes level variation means for variably controlling the level of the light signal from said light source, and control signal selection means for controlling so that, when the level of the light signal from said light source is to be controlled, a control signal from said level variation means is selected preferentially.

17. A light signal remote control apparatus as claimed in claim 7, wherein said light transmission section includes level variation means for variably controlling the level of the light signal from said light source, and control signal selection means for controlling so that, when the level of the light signal from said light source is to be controlled, a control signal from said level variation means is selected preferentially.

18. A light signal remote control apparatus as claimed in claim 8, wherein said light transmission section includes level variation means for variably controlling the level of the light signal from said light source, and control signal selection means for controlling so that, when the level of the light signal from said light source is to be controlled, a control signal from said level variation means is selected preferentially.

19. A light signal remote control apparatus as claimed in claim 9, wherein said light transmission section includes level variation means for variably controlling the level of the light signal from said light source, and control signal selection means for controlling so that, when the level of the light signal from said light source is to be controlled, a control signal from said level variation means is selected preferentially.

20. A light signal remote control apparatus as claimed in claim 10, wherein said light transmission section includes level variation means for variably controlling the level of the light signal from said light source, and control signal selection means for controlling so that, when the level of the light signal from said light source is to be controlled, a control signal from said level variation means is selected preferentially.

21. A light signal remote control apparatus as claimed in claim 1, further comprising selection information identification means for receiving the light control signal from said first control section and the light control signal from said second control section as input signals thereto and identifying the light control signal selected by said switch section.

22. A light signal remote control apparatus as claimed in claim 2, further comprising selection information identification means for receiving the light control signal from said first control section and the light control signal from said second control section as input signals thereto and identifying the light control signal selected by said switch section.

23. A light signal remote control apparatus as claimed in claim 3, further comprising selection information identification means for receiving the light control signal from said first control section and the light control signal from said second control section as input signals thereto and identifying the light control signal selected by said switch section.

24. A light signal remote control apparatus as claimed in claim 4, further comprising selection information identification means for receiving the light control signal from said first control section and the light control signal from said second control section as input signals thereto and identifying the light control signal selected by said switch section.

25. A light signal remote control apparatus as claimed in claim 5, further comprising selection information identification means for receiving the light control signal from said first control section and the light control signal from said second control section as input signals thereto and identifying the light control signal selected by said switch section.

26. A light signal remote control apparatus as claimed in claim 6, further comprising selection information identification means for receiving the light control signal from said first control section and the light control signal from said second control section as input signals thereto and identifying the light control signal selected by said switch section.

27. A light signal remote control apparatus as claimed in claim 7, further comprising selection information identification means for receiving the light control signal from said first control section and the light control signal from said second control section as input signals thereto and identifying the light control signal selected by said switch section.

28. A light signal remote control apparatus as claimed in claim 8, further comprising selection information identification means for receiving the light control signal from said first control section and the light control signal from said second control section as input signals thereto and identifying the light control signal selected by said switch section.

29. A light signal remote control apparatus as claimed in claim 9, further comprising selection information identification means for receiving the light control signal from said first control section and the light control signal from said second control section as input signals thereto and identifying the light control signal selected by said switch section.

30. A light signal remote control apparatus as claimed in claim 10, further comprising selection information identification means for receiving the light control signal from said first control section and the light control signal from said second control section as input signals thereto and identifying the light control signal selected by said switch section.

31. A light signal remote control apparatus as claimed in claim 11, further comprising selection information identification means for receiving the light control signal from said first control section and the light control signal from said second control section as input signals thereto and identifying the light control signal selected by said switch section.

32. A light signal remote control apparatus as claimed in claim 12, further comprising selection information identifi- 33. A light signal remote control apparatus as claimed in claim 13, further comprising selection information identification means for receiving the light control signal from said first control section and the light control signal from said second control section as input signals thereto and identifying the light control signal selected by said switch section.

34. A light signal remote control apparatus as claimed in claim 14, further comprising selection information identification means for receiving the light control signal from said first control section and the light control signal from said second control section as input signals thereto and identifying the light control signal selected by said switch section.

35. A light signal remote control apparatus as claimed in claim 15, further comprising selection information identification means for receiving the light control signal from said first control section and the light control signal from said second control section as input signals thereto and identifying the light control signal selected by said switch section.

36. A light signal remote control apparatus as claimed in claim 16, further comprising selection information identification means for receiving the light control signal from said first control section and the light control signal from said second control section as input signals thereto and identifying the light control signal selected by said switch section.

37. A light signal remote control apparatus as claimed in claim 17, further comprising selection information identification means for receiving the light control signal from said first control section and the light control signal from said second control section as input signals thereto and identifying the light control signal selected by said switch section.

38. A light signal remote control apparatus as claimed in claim 18, further comprising selection information identification means for receiving the light control signal from said first control section and the light control signal from said second control section as input signals thereto and identifying the light control signal selected by said switch section.

39. A light signal remote control apparatus as claimed in claim 19, further comprising selection information identification means for receiving the light control signal from said first control section and the light control signal from said second control section as input signals thereto and identifying the light control signal selected by said switch section.

40. A light signal remote control apparatus as claimed in claim 20, further comprising selection information identification means for receiving the light control signal from said first control section and the light control signal from said second control section as input signals thereto and identifying the light control signal selected by said switch section.

41. A light signal level controlling method for a light signal remote control apparatus which includes a light transmission section including a light source for emitting light to be transmitted, and a light reception section located in a spaced relationship from said light transmission section and including a first light detection section for receiving the light signal from said light source of said light transmission section via an optical fiber, comprising the steps of:

producing, in response to light detection information detected by said first light detection section of said light reception section, a first light control signal for controlling a state of the light signal from said light source;

producing, in said light transmission section, in response to a light emitting state of said light source, a second light control signal for controlling the state of the light signal from said light source; and selectively outputting to said light source one of the first light control signal and the second light control signal with which the light signal from said light source is controlled lower than that with the other.

42. A light signal level controlling method for a light signal remote control apparatus as claimed in claim 41, wherein the first light control signal is produced in said light reception section, and the first light control signal is multiplexed with the light signal from said light source of said light transmission section and transmitted via said optical fiber.

43. A light signal transmission apparatus, comprising:

a supervisory signal light production apparatus including a supervisory signal light source for producing supervisory signal light;

a transmission apparatus connected to said supervisory signal light production apparatus via an optical fiber for multiplexing signal light as a main signal with the supervisory signal light transmitted thereto from said supervisory signal light source via said optical fiber and transmitting the multiplexed signal light;

a light branching section for branching the supervisory signal light transmitted thereto via said optical fiber;

a first level detection section for detecting a level of part of the light signal branched by said light branching section;

a first level control signal outputting section for outputting, in response to detection information from said first level detection section, a control signal for controlling a level of the supervisory signal light to be produced by said supervisory signal light source;

a second level detection section for receiving backward light of the supervisory signal light produced by said supervisory signal light production apparatus and detecting a level of the backward light;

a second level control signal outputting section for outputting, in response to detection information from said second level detection section, a control signal for controlling the level of the supervisory signal light to be produced by said supervisory signal light source so as to become higher than the level of the supervisory signal light to be controlled by the control signal from said first level control signal outputting section;

a switch section for selecting one of the control signal from said first level control signal outputting section and the control signal from said second level control signal outputting section with which the level of the supervisory signal light is controlled lower than that with the other; and a supervisory signal light control section for controlling said supervisory signal light source in response to control information from said switch section so that the supervisory signal light to be produced by said supervisory signal light source has a fixed level.

44. A supervisory signal light level controlling method for a light signal transmission apparatus which includes a supervisory signal light production apparatus including a supervisory signal light source for producing supervisory signal light, and a transmission apparatus connected to said supervisory signal light production apparatus via an optical fiber for multiplexing signal light as a main signal with the supervisory signal light transmitted thereto from said supervisory signal light source via said optical fiber and transmitting the multiplexed signal light via said optical fiber, comprising the steps of:

detecting a level of the supervisory signal light transmitted via said optical fiber and producing, in response to the detected level, a first control signal for controlling a level of the supervisory signal light;

detecting a level of backward light of the supervisory signal light produced by said supervisory signal light production apparatus and producing, in response to the detected level, a second control signal for controlling a level of the supervisory signal light; and controlling the level of the supervisory signal light to be produced by said supervisory signal light source using the first control signal when the level of the supervisory signal light controlled is lower than a value set in advance, but controlling the level of the supervisory signal light to be produced by said supervisory signal light source using the second control signal when the level of the supervisory signal light is higher than the value set in advance.

45. A supervisory signal light level controlling method for a light signal transmission apparatus as claimed in claim 44, wherein the first control signal is produced as a light signal by said transmission apparatus and the light signal produced is multiplexed with the supervisory signal light from said supervisory signal light production apparatus and outputted to said supervisory signal light production apparatus via said optical fiber.

46. A supervisory signal light level controlling method for a light signal transmission apparatus as claimed in claim 44, wherein the value set in advance is a level of the supervisory signal light produced by said supervisory signal light source using the second control signal.

* * * * *